(12) United States Patent
Kasako et al.

(10) Patent No.: US 7,430,648 B2
(45) Date of Patent: *Sep. 30, 2008

(54) REMOTE STORAGE DISK CONTROL DEVICE WITH FUNCTION TO TRANSFER COMMANDS TO REMOTE STORAGE DEVICES

(75) Inventors: Naohisa Kasako, Odawara (JP); Shuji Kondo, Odawara (JP); Toru Suzuki, Odawara (JP); Takeshi Koide, Odawaha (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/707,038

(22) Filed: Feb. 16, 2007

(65) Prior Publication Data

US 2007/0150680 A1    Jun. 28, 2007

Related U.S. Application Data

(63) Continuation of application No. 11/050,927, filed on Feb. 4, 2005, now Pat. No. 7,200,727, which is a continuation of application No. 11/010,216, filed on Dec. 10, 2004, now Pat. No. 7,080,202, which is a continuation of application No. 10/820,629, filed on Apr. 8, 2004, now Pat. No. 7,203,806.

(30) Foreign Application Priority Data

Sep. 17, 2003  (JP)  ............................. 2003-325082
Nov. 28, 2003  (JP)  ............................. 2003-400513

(51) Int. Cl.
G06F 12/00   (2006.01)

(52) U.S. Cl. ..................................... 711/162; 711/112

(58) Field of Classification Search ....................... None
See application file for complete search history.

(56) References Cited

U.S. PATENT DOCUMENTS 3,771,137 A    11/1973   Barner et al.

(Continued)

FOREIGN PATENT DOCUMENTS

EP    0869438    10/1998

(Continued)

OTHER PUBLICATIONS

JP 2003-400513, Office Action, Sep. 3, 2007, English translation, 3 pgs.

(Continued)

*Primary Examiner*—Brian R Peugh
(74) *Attorney, Agent, or Firm*—Mattingly, Stanger, Malur & Brundidge, P.C.

(57) ABSTRACT

A storage device system includes an information processing device and at least first and second storage devices. The first and second storage devices are equipped with first and second storage volumes, respectively. The information processing device generates first data including a first instruction that is to be executed by the second storage device, and sends a write request to a first write request section to write the first data according to a first communications protocol in the first storage volume. When the first data written in the first storage volume is the command to be executed by the second storage device, the first storage device sends to a second write request section a write request to write the first data according to a second communications protocol in the second storage volume. The second storage device executes the first command set in the first data that is written in the second storage volume.

71 Claims, 29 Drawing Sheets

U.S. PATENT DOCUMENTS

| | | | |
|---|---|---|---|
| 4,025,904 A | 5/1977 | Adney et al. | |
| 5,155,845 A | 10/1992 | Beal et al. | |
| 5,408,465 A | 4/1995 | Gusella et al. | |
| 5,459,857 A | 10/1995 | Ludlam et al. | |
| 5,504,882 A | 4/1996 | Chai et al. | |
| 5,515,521 A | 5/1996 | Whitted et al. | |
| 5,548,712 A | 8/1996 | Larson et al. | |
| 5,596,706 A | 1/1997 | Shimazaki et al. | |
| 5,680,580 A | 10/1997 | Beardsley et al. | |
| 5,680,640 A | 10/1997 | Ofek et al. | |
| 5,692,155 A | 11/1997 | Iskiyan et al. | |
| 5,758,118 A | 5/1998 | Choy et al. | |
| 5,835,954 A | 11/1998 | Duyanovich et al. | |
| 5,870,537 A | 2/1999 | Kern et al. | |
| 5,895,485 A | 4/1999 | Loechel et al. | |
| 5,917,723 A | 6/1999 | Binford | |
| 5,956,750 A | 9/1999 | Yamamoto et al. | |
| 5,978,890 A | 11/1999 | Ozawa et al. | |
| 6,012,123 A | 1/2000 | Pecone et al. | |
| 6,098,129 A | 8/2000 | Fukuzawa et al. | |
| 6,101,497 A | 8/2000 | Ofek | |
| 6,108,748 A | 8/2000 | Ofek et al. | |
| 6,148,383 A | 11/2000 | Micka et al. | |
| 6,173,374 B1 | 1/2001 | Heil et al. | |
| 6,195,730 B1 | 2/2001 | West | |
| 6,209,002 B1 | 3/2001 | Gagne et al. | |
| 6,219,753 B1 | 4/2001 | Richardson | |
| 6,230,239 B1 | 5/2001 | Sakaki et al. | |
| 6,237,008 B1 | 5/2001 | Beal et al. | |
| 6,240,486 B1 | 5/2001 | Ofek et al. | |
| 6,240,494 B1 | 5/2001 | Nagasawa et al. | |
| 6,247,099 B1 | 6/2001 | Skazinski et al. | |
| 6,247,103 B1 | 6/2001 | Kern et al. | |
| 6,253,295 B1 | 6/2001 | Beal et al. | |
| 6,351,792 B1 | 2/2002 | Milillo | |
| 6,356,977 B2 | 3/2002 | Ofek et al. | |
| 6,374,327 B2 | 4/2002 | Sakaki et al. | |
| 6,393,537 B1 | 5/2002 | Kern et al. | |
| 6,421,767 B1 | 7/2002 | Milillo | |
| 6,446,141 B1 | 9/2002 | Nolan et al. | |
| 6,446,175 B1 | 9/2002 | West et al. | |
| 6,453,354 B1 | 9/2002 | Jiang et al. | |
| 6,457,109 B1 | 9/2002 | Milillo et al. | |
| 6,457,139 B1 | 9/2002 | D'Errico et al. | |
| 6,484,173 B1 | 11/2002 | O'Hare et al. | |
| 6,484,187 B1 | 11/2002 | Kern et al. | |
| 6,490,659 B1 | 12/2002 | McKean et al. | |
| 6,523,096 B2 | 2/2003 | Sanada et al. | |
| 6,526,419 B1 | 2/2003 | Burton et al. | |
| 6,529,944 B1 | 3/2003 | Lecrone | |
| 6,529,976 B1 | 3/2003 | Fukuzawa et al. | |
| 6,539,462 B1 | 3/2003 | Mikkelsen et al. | |
| 6,553,408 B1 | 4/2003 | Merrel et al. | |
| 6,587,933 B2 | 7/2003 | Crockett | |
| 6,587,935 B2 | 7/2003 | Ofek | |
| 6,591,351 B1 | 7/2003 | Urabe et al. | |
| 6,598,134 B2 | 7/2003 | Ofek et al. | |
| 6,631,477 B1 | 10/2003 | Le Crone et al. | |
| 6,640,278 B1 | 10/2003 | Nolan et al. | |
| 6,640,291 B2 | 10/2003 | Fujibayashi | |
| 6,643,671 B2 | 11/2003 | Milillo | |
| 6,643,750 B2 | 11/2003 | Achiwa et al. | |
| 6,647,474 B2 | 11/2003 | Yanai et al. | |
| 6,647,476 B2 | 11/2003 | Nagasawa et al. | |
| 6,654,830 B1 | 11/2003 | Taylor et al. | |
| 6,654,831 B1 | 11/2003 | Otterness et al. | |
| 6,658,540 B1 | 12/2003 | Sicola et al. | |
| 6,675,258 B1 | 1/2004 | Bramhall et al. | |
| 6,681,303 B1 | 1/2004 | Watabe et al. | |
| 6,681,339 B2 | 1/2004 | McKean et al. | |
| 6,684,310 B2 | 1/2004 | Anzai et al. | |
| 6,687,718 B2 | 2/2004 | Gagne et al. | |
| 6,697,367 B1 | 2/2004 | Halstead et al. | |
| 6,708,232 B2 | 3/2004 | Obara | |
| 6,745,281 B1 | 6/2004 | Saegusa | |
| 6,799,255 B1 | 9/2004 | Blumenau et al. | |
| 6,813,698 B2 | 11/2004 | Gallo et al. | |
| 6,816,948 B2 | 11/2004 | Kitamura et al. | |
| 6,826,778 B2 | 11/2004 | Bopardikar et al. | |
| 6,851,020 B2 | 2/2005 | Matsumoto et al. | |
| 6,883,064 B2 | 4/2005 | Yoshida et al. | |
| 6,922,762 B2 * | 7/2005 | Hirakawa et al. | 711/162 |
| 7,082,506 B2 | 7/2006 | Nakano et al. | |
| 7,219,201 B2 * | 5/2007 | Kasako et al. | 711/162 |
| 2001/0050915 A1 | 12/2001 | O'Hare et al. | |
| 2001/0052018 A1 | 12/2001 | Yokokura | |
| 2002/0004857 A1 | 1/2002 | Arakawa et al. | |
| 2002/0004890 A1 | 1/2002 | Ofek et al. | |
| 2002/0019908 A1 | 2/2002 | Reuter et al. | |
| 2002/0019920 A1 | 2/2002 | Reuter et al. | |
| 2002/0019922 A1 | 2/2002 | Reuter et al. | |
| 2002/0019923 A1 | 2/2002 | Reuter et al. | |
| 2002/0026558 A1 | 2/2002 | Reuter et al. | |
| 2002/0029326 A1 | 3/2002 | Reuter et al. | |
| 2002/0065864 A1 | 5/2002 | Hartsell et al. | |
| 2002/0078296 A1 | 6/2002 | Nakamura et al. | |
| 2002/0087544 A1 | 7/2002 | Selkirk et al. | |
| 2002/0103889 A1 | 8/2002 | Markson et al. | |
| 2002/0103968 A1 | 8/2002 | Grover | |
| 2002/0112113 A1 | 8/2002 | Karpoff | |
| 2002/0120664 A1 | 8/2002 | Horn et al. | |
| 2002/0133735 A1 | 9/2002 | McKean et al. | |
| 2002/0143903 A1 | 10/2002 | Uratani et al. | |
| 2002/0156887 A1 | 10/2002 | Hashimoto | |
| 2002/0156984 A1 | 10/2002 | Padovano | |
| 2002/0156987 A1 | 10/2002 | Gajjar et al. | |
| 2002/0178335 A1 | 11/2002 | Selkirk et al. | |
| 2002/0188592 A1 | 12/2002 | Leonhardt et al. | |
| 2002/0194428 A1 | 12/2002 | Green | |
| 2002/0194523 A1 | 12/2002 | Ulrich et al. | |
| 2003/0002503 A1 | 1/2003 | Brewer | |
| 2003/0037071 A1 | 2/2003 | Harris et al. | |
| 2003/0051109 A1 | 3/2003 | Cochran | |
| 2003/0051111 A1 | 3/2003 | Nakano et al. | |
| 2003/0056038 A1 | 3/2003 | Cochran | |
| 2003/0078903 A1 | 4/2003 | Kimura et al. | |
| 2003/0093597 A1 | 5/2003 | Marshak et al. | |
| 2003/0097607 A1 | 5/2003 | Bessire | |
| 2003/0101228 A1 | 5/2003 | Busser et al. | |
| 2003/0105931 A1 | 6/2003 | Weber et al. | |
| 2003/0115432 A1 | 6/2003 | Biessener et al. | |
| 2003/0126107 A1 | 7/2003 | Yamagami | |
| 2003/0126327 A1 | 7/2003 | Pesola et al. | |
| 2003/0145168 A1 | 7/2003 | LeCrone et al. | |
| 2003/0145169 A1 | 7/2003 | Nagasawa | |
| 2003/0158999 A1 | 8/2003 | Hauck et al. | |
| 2003/0163553 A1 | 8/2003 | Kitamura et al. | |
| 2003/0167419 A1 | 9/2003 | Yanai et al. | |
| 2003/0182525 A1 | 9/2003 | O'Connell | |
| 2003/0185064 A1 | 10/2003 | Hirakawa et al. | |
| 2003/0200387 A1 | 10/2003 | Urabe et al. | |
| 2003/0204597 A1 | 10/2003 | Arakawa et al. | |
| 2003/0212854 A1 | 11/2003 | Kitamura et al. | |
| 2003/0212860 A1 | 11/2003 | Jiang et al. | |
| 2003/0221077 A1 | 11/2003 | Ohno et al. | |
| 2003/0229764 A1 | 12/2003 | Ohno et al. | |
| 2004/0003022 A1 | 1/2004 | Garrison et al. | |
| 2004/0049553 A1 | 3/2004 | Iwamura et al. | |
| 2004/0054850 A1 | 3/2004 | Fisk et al. | |
| 2004/0064610 A1 | 4/2004 | Fukuzawa et al. | |
| 2004/0064641 A1 | 4/2004 | Kodama | |
| 2004/0073831 A1 | 4/2004 | Yanai et al. | |
| 2004/0078535 A1 | 4/2004 | Suzuki et al. | |
| 2004/0088417 A1 | 5/2004 | Bober et al. | |

| | | | |
|---|---|---|---|
| 2004/0098547 | A1 | 5/2004 | Ofek et al. |
| 2004/0117369 | A1 | 6/2004 | Mandal |
| 2004/0123026 | A1 | 6/2004 | Kaneko |
| 2004/0123180 | A1 | 6/2004 | Soejima et al. |
| 2004/0143832 | A1 | 7/2004 | Yamamoto et al. |
| 2004/0148443 | A1 | 7/2004 | Achiwa |
| 2004/0158652 | A1 | 8/2004 | Obara |
| 2004/0172510 | A1 | 9/2004 | Nagashima et al. |
| 2004/0186968 | A1 | 9/2004 | Factor |
| 2004/0193795 | A1 | 9/2004 | Takeda et al. |
| 2004/0230980 | A1 | 11/2004 | Koyama et al. |
| 2004/0260735 | A1 | 12/2004 | Martinez |
| 2004/0260875 | A1 | 12/2004 | Murotani et al. |
| 2004/0260966 | A1 | 12/2004 | Kaiya et al. |
| 2004/0267829 | A1 | 12/2004 | Hirakawa et al. |
| 2005/0010743 | A1 | 1/2005 | Tremblay et al. |
| 2005/0033828 | A1 | 2/2005 | Watanabe |
| 2005/0060505 | A1 | 3/2005 | Kasako et al. |
| 2005/0081009 | A1 | 4/2005 | Williams et al. |
| 2005/0102479 | A1 | 5/2005 | Innan et al. |
| 2005/0166023 | A1 | 7/2005 | Kasako et al. |
| 2005/0240741 | A1 | 10/2005 | Nagasawa et al. |

FOREIGN PATENT DOCUMENTS

| | | |
|---|---|---|
| EP | 0869438 A2 | 10/1998 |
| EP | 1130514 | 9/2001 |
| EP | 1313017 A1 | 5/2003 |
| JP | 06-214853 | 8/1994 |
| JP | 08-137772 | 5/1996 |
| JP | 09-288547 | 4/1997 |
| JP | 10-283272 | 10/1998 |
| JP | 11-184641 | 7/1999 |
| JP | 2000/293317 | 10/2000 |
| JP | 2001/067187 | 3/2001 |
| JP | 2002/157091 | 5/2002 |
| JP | 2002/230246 | 8/2002 |
| JP | 2002-259183 | 9/2002 |
| JP | 2003-122509 | 4/2003 |
| JP | 2003-131917 | 5/2003 |
| WO | 97-09676 | 3/1997 |
| WO | 97/45790 | 12/1997 |
| WO | 01/53945 | 7/2001 |
| WO | 01/97030 | 12/2001 |

OTHER PUBLICATIONS

Storage Subsystem Library, "IBM 3990 Storage Control Reference", Sep. 1991, 5th Ed., 2 pages.

English Translation of Office Action, JP 2003-400513, dated May 7, 2007, 8 pages.

"Introduction to Storage Pooling, Consolidation Storage Resources with DataCore SANsymphony Software", White Paper, DataCore Software, updaged Jul. 2003, pp. 1-8.

"SAN Virtualization Guidelines", DataCore Software Corporation, 2000, pp. 1-9.

Sarkar et al, "Internet Protocol storage area networks" IBM Systems Journal, 2003, vol. 42, No. 2, pp. 218-231.

SICOLA "SCSI-3 Fault Tolerant Controller Configurations", T10 Technical Committee of the International Committee on Information Technology Standards, Feb. 28, 1996, available at http://ww.t10.org(1996).

"Network Attached Storage", Product White Paper, Feb. 2002, Sony Electronics Inc., (2002).

Anderson et al, "Hippodrome: Running Circles Around Storage Administration", Proceedings of Conference on File and Storage Technologies (Fast '02), Jan. 2002, pp. 175-188.

Milligan et al, "Online Storage Virtualization: The Key to Managing the Data Explosion", Proceedings of the 35th Annual Hawaii International Conference on Systems Sciences, 2002, 9 pages.

"Microsoft Press Computer Dictionary", 1997, Microsoft Press, 3rd Ed., definition of cache.

"Symmetric 3000 and 5000 Enterprise Storage Systems Product Description Guide", 1999, EMC Corp., pp. 13-16 and 20. Accessed at http://www.emc.com/products/product_pdfs/pdg/symm_3_5_pdg.pdf.

Remote Storage Disk Control Device with Function to Transfer Commands to Remote Storage Devices, pp. 1-86 . . . Fig. 1-28.

Remote Storage Disk Control Device and Method for Controlling the Same, p. 1-51 . . . Figs. 1-14.

"EMC TimeFinder Product Description Guide", Aug. 19, 2000, pp. 1-34.

\* cited by examiner

| LUN | TARGET | MAPPING LUN |
|-----|--------|-------------|
| 0   |        | 0           |
| 1   |        | 1           |
| ⋮   | ⋮      | ⋮           |

~ 301

| DEVICE | COMMAND DEVICE LUN |
|--------|--------------------|
| FIRST  | 0                  |
| SECOND | 1                  |

~ 501

601

| COPY SOURCE DEVICE | COPY DESTINATION DEVICE | PRIMARY LUN | PRIMARY JOURNAL | AUXILIARY LUN | AUXILIARY JOURNAL LUN |
|---|---|---|---|---|---|
| FIRST | SECOND | 0 | 3 | 0 | 3 |
| FIRST | SECOND | 1 | 4 | 1 | 4 |
| FIRST | SECOND | 2 | 5 | 2 | 5 |
| ⋮ | ⋮ | ⋮ | ⋮ | ⋮ | ⋮ |

| COPY SOURCE DEVICE | COPY DESTINATION DEVICE | PRIMARY LUN | AUXILIARY LUN |
|---|---|---|---|
| FIRST | SECOND | 0 | 0 |
| FIRST | SECOND | 1 | 1 |
| FIRST | SECOND | 2 | 2 |
| ⋮ | ⋮ | ⋮ | ⋮ |

| DEVICE | PATH |
|---|---|
| FIRST STORAGE DEVICE | DIRECT |
| SECOND STORAGE DEVICE | FIRST |

| IDENTIFICATION NUMBER |
|---|
| TRANSFER DESTINATION PARAMETER |
| TRANSFER DESTINATION ADDRESS |
| ⋮ |
| CONTROL PARAMETER |
| PROCESS NUMBER |
| EDITED DATA PRESENCE/ABSENCE |
| INPUT PARAMTER |

REMOTE STORAGE DISK CONTROL DEVICE WITH FUNCTION TO TRANSFER COMMANDS TO REMOTE STORAGE DEVICES

This is a continuation application of U.S. Ser. No. 11/050,927, filed Feb. 4, 2005 (now U.S. Pat. No. 7,200,727), which is a continuation application of U.S. Ser. No. 11/010,216, filed Dec. 10, 2004 (now U.S. Pat. No. 7,080,202), which is a continuation application of U.S. Ser. No. 10/820,629, filed Apr. 8, 2004 (now U.S. Pat. No. 7,203,806).

CROSS-REFERENCE TO RELATED APPLICATIONS

The present invention is related to Japanese patent application No. 2003-400513 filed in Japan on Nov. 28, 2003, and Japanese patent application No. 2003-325082 filed in Japan on Sep. 17, 2003, which are incorporated herein by reference.

BACKGROUND OF THE INVENTION

1. Field of the Invention

The present invention relates to a method for controlling a storage device system, a storage device system, and a storage device.

2. Related Background Art

Disaster recovery in information processing systems is attracting attention. As a technology to realize such disaster recovery, a technology in which a copy of data stored in a storage device that is installed in a primary site is also managed by a storage device that is installed in a remote site located away from the primary site is known. By using the data stored in the storage device installed at the remote site when the primary site is hit by a disaster, processings that are performed at the primary site can be continued at the remote site.

For data transfer from the primary site to the remote site, a method in which data is exchanged between an information processing device at the primary site and an information processing device at the remote site is known. The information processing device at the primary site transfers a copy of data that is written in the storage device at the primary site to the information processing device at the remote site. The information processing device at the remote site that has received the copy of data sends a request to write the data in the storage device at the remote site.

When data is stored as a backup by the method described above, a substantially large amount of data flow occurs on the network between the information processing devices. This causes a variety of problems such as an increased interface processing load on the information processing devices, delays in other data transmissions to be conducted between the information processing devices, and the like. Also, the method described above needs software to control data backup to be installed in each of the information processing devices. For this reason, management works such as upgrading the software and the like need to be performed on all of the information processing devices that execute data backup processings, which increases the management cost.

SUMMARY OF THE INVENTION

The present invention has been made in view of the problems described above, and relates to a storage device system, a storage device and a method for controlling a storage device system.

In accordance with an embodiment of the present invention, there is provided a method for controlling a storage device system that includes: at least one information processing device, a first storage device equipped with a first storage volume, and a second storage device equipped with a second storage volume, wherein the information processing device and the first storage device are communicatively connected to one another, the first storage device and the second storage device are communicatively connected to one another, the information processing device is equipped with a first write request section that requests to write data in the first storage device according to a first communications protocol, and the first storage device is equipped with a second write request section that requests to write data in the second storage device according to a second communications protocol. The method comprises: a step in which the information processing device sets a first instruction to be executed at the second storage device as first data; a step in which the information processing device sends a request to write the first data in the first storage volume to the first write request section; a step in which, when the first data written in the first storage volume is an instruction to the second storage device, the first storage device sends a request to write the first data in the second storage volume to the second write request section; and a step in which the second storage device executes the first instruction that is set as the first data written in the second storage volume.

It is noted that the information processing device may be, for example, a personal computer, a work station or a mainframe computer. The storage device may be, for example, a disk array device or a semiconductor storage device. The storage volume may be a storage resource that includes a physical volume that is a physical storage region provided by a disk drive, and a logical volume that is a storage region logically set on the physical volume. Also, the communications protocol may be, for example, a WRITE command stipulated by a SCSI (Small Computer System Interface) standard. As a result, without adding new commands to the operating system, the information processing device can make the second storage device to execute the first command.

Here, for example, when the first command is a command to read data of the first storage device, the second storage device can have a copy of the data of the first storage device according to an instruction from the information processing device. Therefore the present method can reduce the amount of data communicated between the information processing devices in the data backup management. Also, software for controlling data backup does not have to be installed on all of the information processing devices that are performing data backup, which lowers the management costs.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIG. 24 shows a synchronous pair management table in accordance with an embodiment of the present invention.

FIG. 25 shows a path information management table in accordance with an embodiment of the present invention.

FIG. 26 shows a command interface in accordance with an embodiment of the present invention.

PREFERRED EMBODIMENTS OF THE INVENTION

Example of Overall Structure

Figure 1:
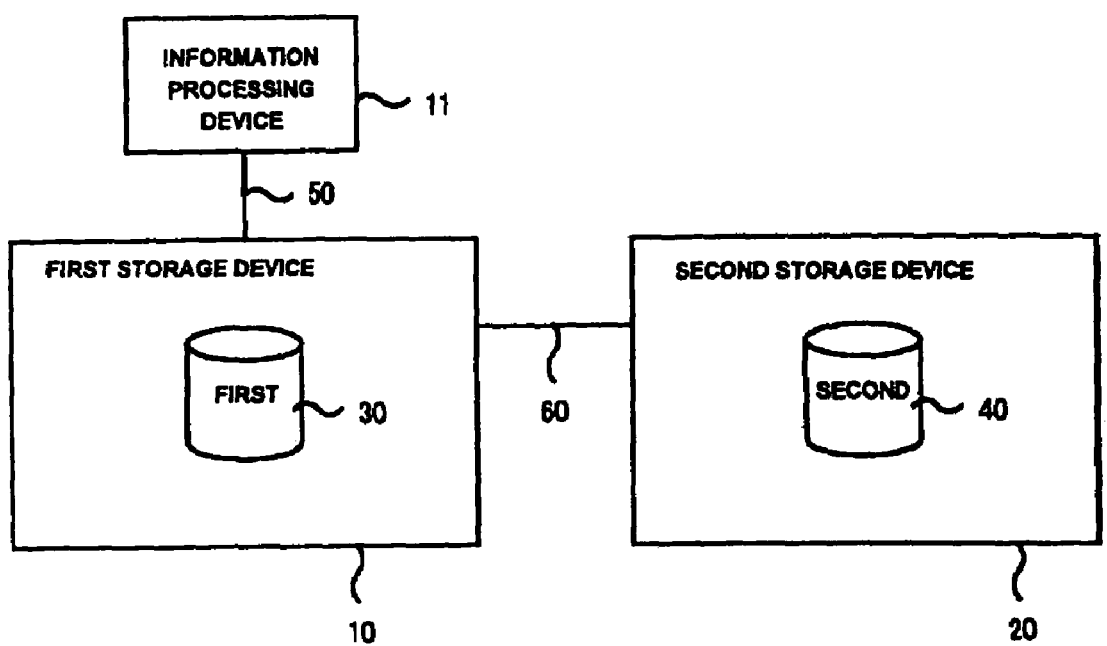
FIG. 1 schematically shows a system configuration of an information processing system in accordance with an embodiment of the present invention.

FIG. 1 schematically shows an overall structure of an information processing system including a storage device system in accordance with an embodiment of the present invention. The information processing system of the present embodiment includes an information processing device 11, and at least a first storage device 10 and a second storage device 20. The first storage device 10 is equipped with a logical volume(s) 30 on which the first storage device performs data input/output processings (hereafter referred to as a "first logical volume(s)"), and the second storage device 20 is equipped with a logical volume(s) 40 on which the second storage device performs data input/output processings (hereafter referred to as a "second logical volume(s)").

The information processing device 11 and the first storage device 10 are communicatively connected to each other via a first network 50. The first network 50 may be, for example, a LAN (Local Area Network), a SAN (Storage Area Network), an iSCSI (Internet Small Computer System Interface), an ESCON (Enterprise Systems Connection)®, or a FICON (Fibre Connection)®.

The first storage device 10 and the second storage device 20 are communicatively connected to each other via a second network 60. The second network 60 may be, for example, a Gigabit Ether Net®, an ATM (Asynchronous Transfer Mode), or a public telephone line.

[Information Processing Device]

The information processing device 11 may be a computer that is equipped with a CPU (Central Processing Unit), memories, and other devices. The information processing device 11 may be a personal computer, a work station or a mainframe computer. The information processing device 11 may be composed of a plurality of computers that are mutually connected. An operating system is operating on the information processing device 11, and application software is operating on the operating system.

[Storage Device]

Figure 2:
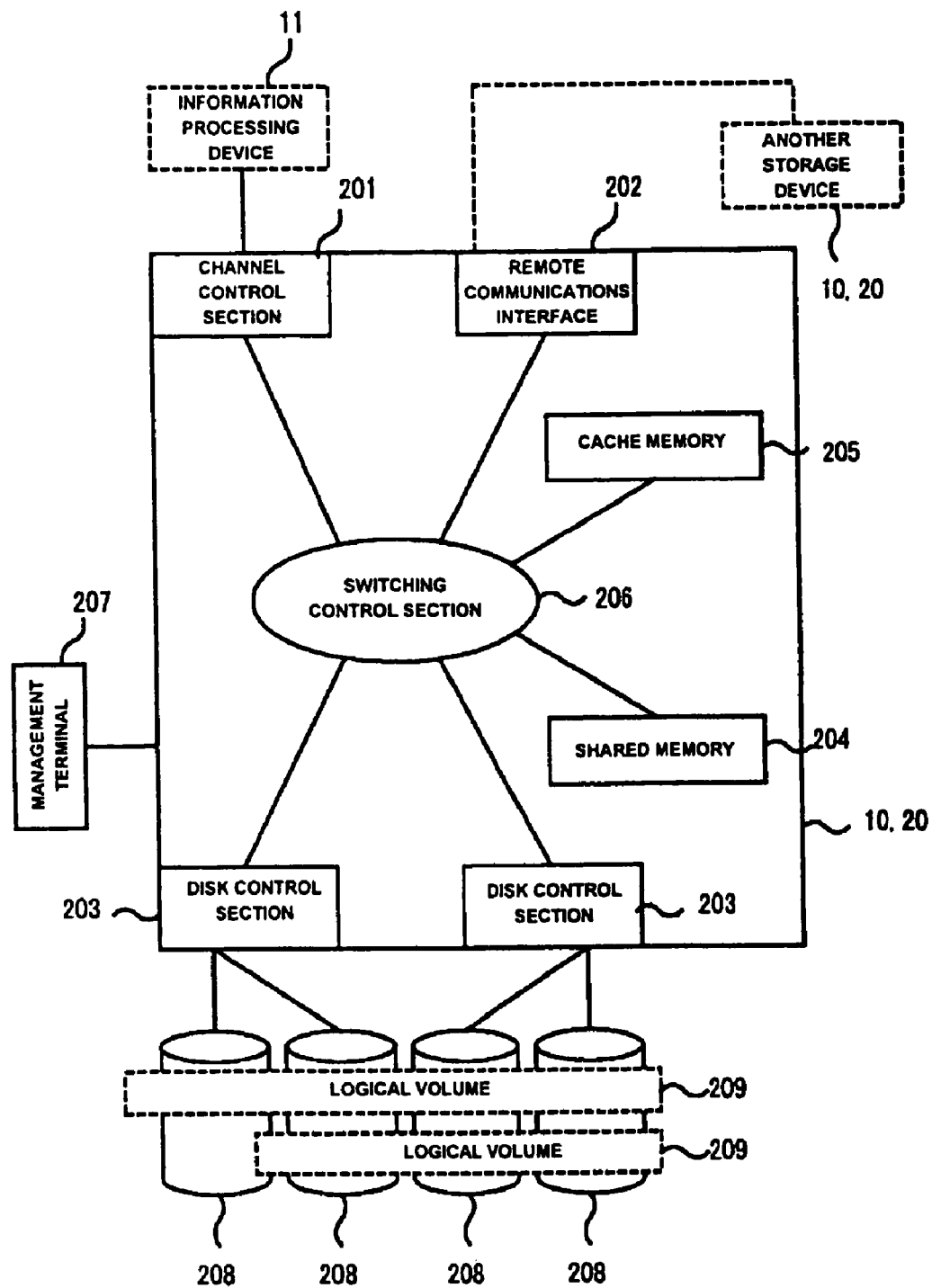
FIG. 2 schematically shows a structure of a disk array device in accordance with an embodiment of the present invention.

FIG. 2 shows a structure of a disk array device, which is described as an example of the first storage device 10 and the second storage device 20. Instead of the disk array device, the first and second storage devices 10 and 20 may be any appropriate devices, such as, for example, semiconductor storage devices. For example, the first storage device 10 is equipped with various components including a channel control section 201, a remote communications interface 202, disk control sections 203, a shared memory 204, a cache memory 205, a switching control section 206 that is composed of cross bus switches that communicatively connect the components described above, a management terminal 207, and memory devices 208. The first and second storage devices 10 and 20 may have the same structure.

The cache memory 205 is used to temporarily store data that is exchanged mainly between the channel control section 201 and the disk control sections 203. For example, when a data input/output command which the channel control section 201 receives from the information processing device 11 is a write command, the channel control section 201 writes in the cache memory 205 write data received from the information processing device 11. Also, an appropriate one of the disk control devices 203 reads the data written in the cache memory 205, and writes the same in the memory devices 208.

The disk control section 203 reads a data I/O request stored in the shared memory 204 written by the channel control section 201, and executes data writing processing or data reading processing with respect to the memory devices 208 according to a command set at the data I/O request (for example, a command according to a SCSI standard). The disk control section 203 writes in the cache memory 205 data that has been read out from the memory devices 208. Also, the disk control section 203 transmits to the channel control section 201 notifications, such as, for example, a data write completion notification and a data read completion notification. The disk control section 203 may be equipped with a function to control the memory devices 208 with RAID levels (for example, 0, 1, 5) stipulated in the so-called RAID (Redundant Array of Inexpensive Disks) method.

The memory devices 208 may be, for example, hard disk devices. The memory devices 208 may be provided in one piece with or separately as independent devices from the disk array device. Storage regions provided by the memory devices 208 at each site are managed in units of logical volumes 209, which are volumes that are logically set on the storage regions. Data can be written in or read from the memory devices 208 by designating LUNs (Logical Unit Numbers) that are identifiers appended to the corresponding logical volumes 209. Also, the logical volumes 209 are managed in units of a predetermined data amount such as units of 512 Kb, such that input and output of data in this predetermined unit are conducted. Each of the units is called a logical block, and each of the logical blocks is appended with a logical block address (hereafter referred to as a "LBA") that indicates positional information of the logical block.

The management terminal 207 may be a computer for maintaining and managing the disk array device and the memory devices 208. Changes in the software and parameters to be executed by the channel control section 201 and the disk control section 203 can be conducted by giving instructions from the management terminal 207. The management terminal 207 can be in a form that is built in the disk array device, or can be provided independently from the disk array device.

The remote communications interface 202 is a communications interface (i.e., a channel extender) that is used for data transfer to another storage device. A copy of data is transferred in a remote copy operation to be descried below through this remote communications interface 202. The remote communications interface 202 converts the interface of the channel control section 201 (for example, an interface such as an ESCON® interface or a FICON® interface) to a communications method of the second network 60, whereby data transfer with the other storage device can be realized.

Besides the structure described above, the disk array device may have a structure that functions as a NAS (Network Attached Storage) configured to accept data input/output requests through designating file names from the information processing device 11 according to a relevant protocol such as a NFS (Network File System).

The shared memory 204 can be accessed from both of the channel control section 201 and the disk control section 203. The shared memory 204 is used for delivering data input/output request commands, as well as for storing management information for the storage devices 10 and 20, and the memory devices 208. In the present embodiment, the shared memory 204 stores a LUN map information table 301 shown in FIG. 3, a command device management table 501 shown in FIG. 5, and a pair management table 1001 shown in FIG. 10.

[Virtual Volume]

As described above, the logical volumes 209 are storage regions that are logically set on the physical volumes. Also, by using "virtual volumes" as logical volumes, the storage devices 10 and 20 on which the logical volumes 209 are set can be differentiated from other storage devices that are equipped with physical volumes correlated with the logical volumes 209.

Figures 3, 4:
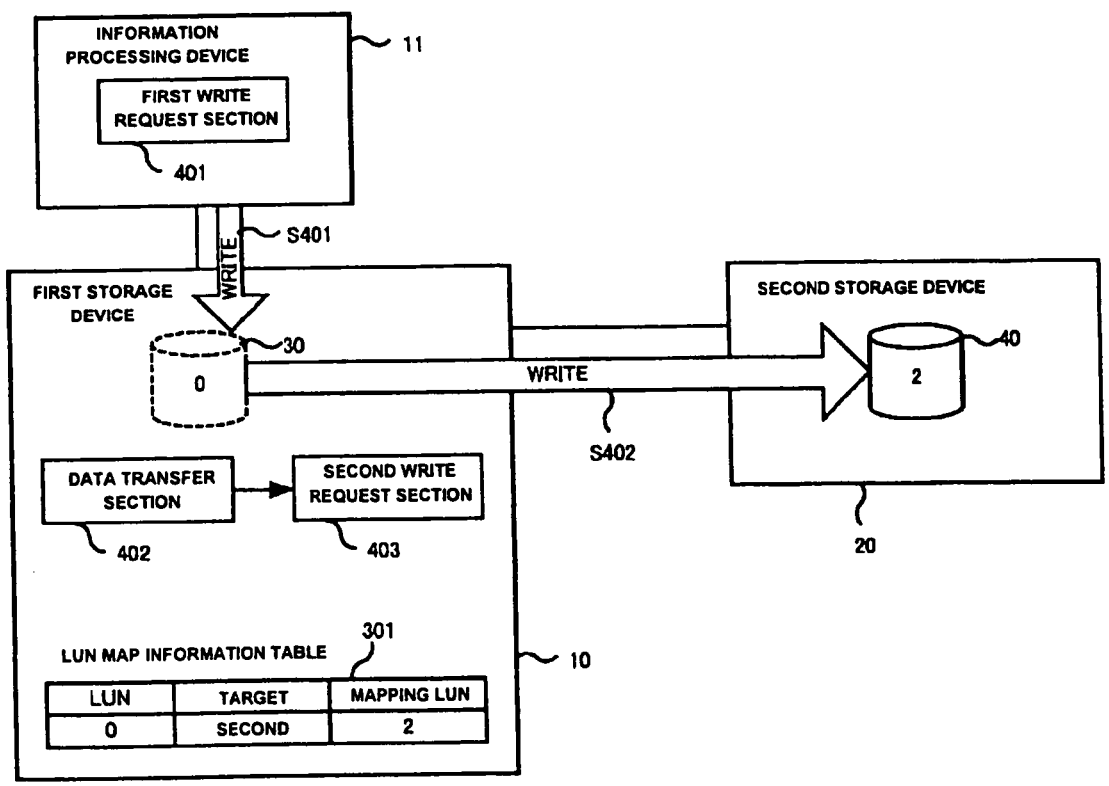
FIG. 3 shows a LUN map information table in accordance with an embodiment of the present invention.
FIG. 4 schematically shows a diagram illustrating a data writing operation using virtual volumes in accordance with an embodiment of the present invention.

To realize this function, the first storage device 10 stores a LUN map information table 301 shown in FIG. 3. The LUN map information table 301 describes information relating to the logical volumes 209 that are handled by the first storage device 10. For example, in the present embodiment, the LUN map information table 301 includes entries of "LUN," "Target" and "Mapping LUN."

Each entry at "LUN" describes a LUN for each of the logical volumes. When a logical volume 209 is a virtual volume, a storage device that is equipped with the logical volume 209 correlated with the virtual volume is set at "Target." Furthermore, a LUN of the logical volume 209 correlated with the virtual volume is set at "Mapping LUN." In other words, when there is a description at "Mapping LUN," it means that the corresponding logical volume is a virtual volume.

Details of the LUN map information table 301 may be registered, for example, by an operator through the management terminal 207 that is connected to the first storage device 10.

The first storage device 10 uses the LUN map information table 301 described above and provides the second logical volume 40 of the second storage device 20 to the information processing device 11 by a mechanism to be described below as if the second logical volume 40 were the first logical volume 30 of the storage device 10. In other words, the information processing device 11 can make data input/output requests, which are to be issued to the logical volume 209 of the second storage device 20, to the first storage device 10.

Processings by the storage device system, which take place when a data input/output request transmitted from the information processing device 11 is a data write request, will be described with reference to FIG. 4.

The information processing device 11 is equipped with a first write request section 401 that writes data in the first storage device, 10 according to a first communications protocol. Upon receiving a data write request from the first write request section 401 (S401), the first storage device 10 writes in the cache memory 205 data to be written that has been received with the data write request.

A data transfer section 402 of the first storage device 10 refers to the LUN map information table 301, and confirms as to whether or not a mapping LUN is set for a first logical volume 30 that is set in the data write request. If a second logical volume 40 is set as the mapping LUN, the data transfer section 402 transfers to a second write request section 403 a request to write the data in the second logical volume 40 according to a second communications protocol. In this embodiment, the second write request section 403 makes data write requests to the second storage device 20 according to the second communications protocol. The second storage device 20 receives the data write request from the second write request section 403, and writes the data in the second logical volume 40 (S402).

It is noted that the first communications protocol and the second communications protocol are for example WRITE commands stipulated by a SCSI standard. Accordingly, the data write interfaces at the first storage device 10 and the second storage device 20 do not need to be changed.

The write processing has been so far described. It is noted however that a read processing to read data from a logical volume is also performed in a manner similar to the write processing except that data is transferred in an opposite direction with respect to the data transfer direction in the write processing.

As describe above, in the storage device system in accordance with the present embodiment, the information processing device 11 accesses the second logical volume as if the second logical volume were a logical volume on the first storage device 10.

[Command Device]

Each of the storage devices 10 and 20 is equipped with a "command device" for controlling special commands. The command device is used to convey commands from the information processing device 11 to the storage devices 10 and 20, and the storage devices 10 and 20 can execute commands that are stored in the command devices. What makes the special commands different from ordinary commands is that the command devices are the logical volumes 209. Functions of the command device will be described below.

Figures 5, 6:
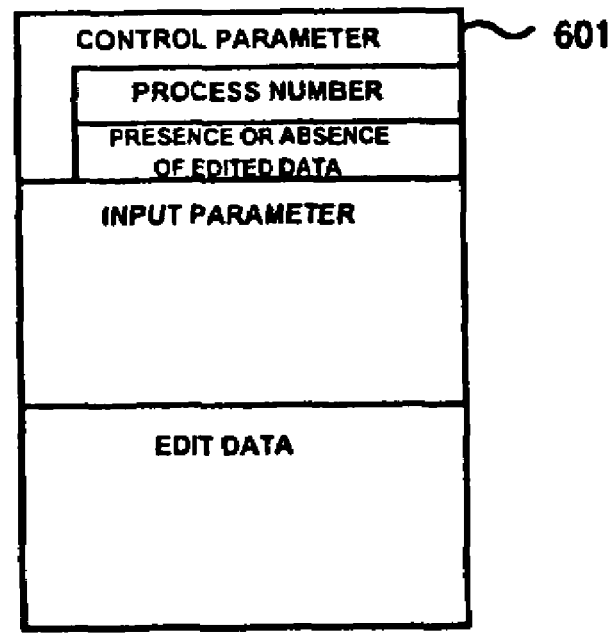
FIG. 5 shows a command device management table in accordance with an embodiment of the present invention.
FIG. 6 shows a command device interface in accordance with an embodiment of the present invention.

FIG. 5 shows a command device management table 501 that is stored in each of the storage devices 10 and 20. The command device management table 501 contains entries such as "Device" and "Command Device LUN." Entries at "Device" indicate as to which of the storage devices 10 and 20 correspond to which of the command devices. Each entry at "Command Device LUN" sets a LUN of each logical volume 209 which expresses the entity of the corresponding command device.

Details of the command device management table 501 may be registered, for example, by an operator through the management terminal 207 that is connected to each of the storage devices 10 and 20.

The command device management table 501 of each of the storage devices 10 and 20 can register command devices of other storage devices (that may be similar to the storage device 10 or 20). When the command devices of the other storage devices are registered, LUNs of virtual volumes, which correspond to the LUNs of the command devices of the other storage devices are registered at the entries "Command Device LUN."

FIG. 6 shows an example of a command device interface 601, which is a data format of data that is written in a command device. The command device interface 601 is composed of a control parameter, an input parameter, and edited data. The control parameter is composed of a "process number" that indicates a command to be executed by a relevant storage device, and a "presence or absence of edited data" that indicates whether or not data is outputted as a result of the execution of the command. The input parameter sets parameter information that is used when executing the command. Also, the edited data sets data that is outputted as a result of executing the command.

Figure 7:
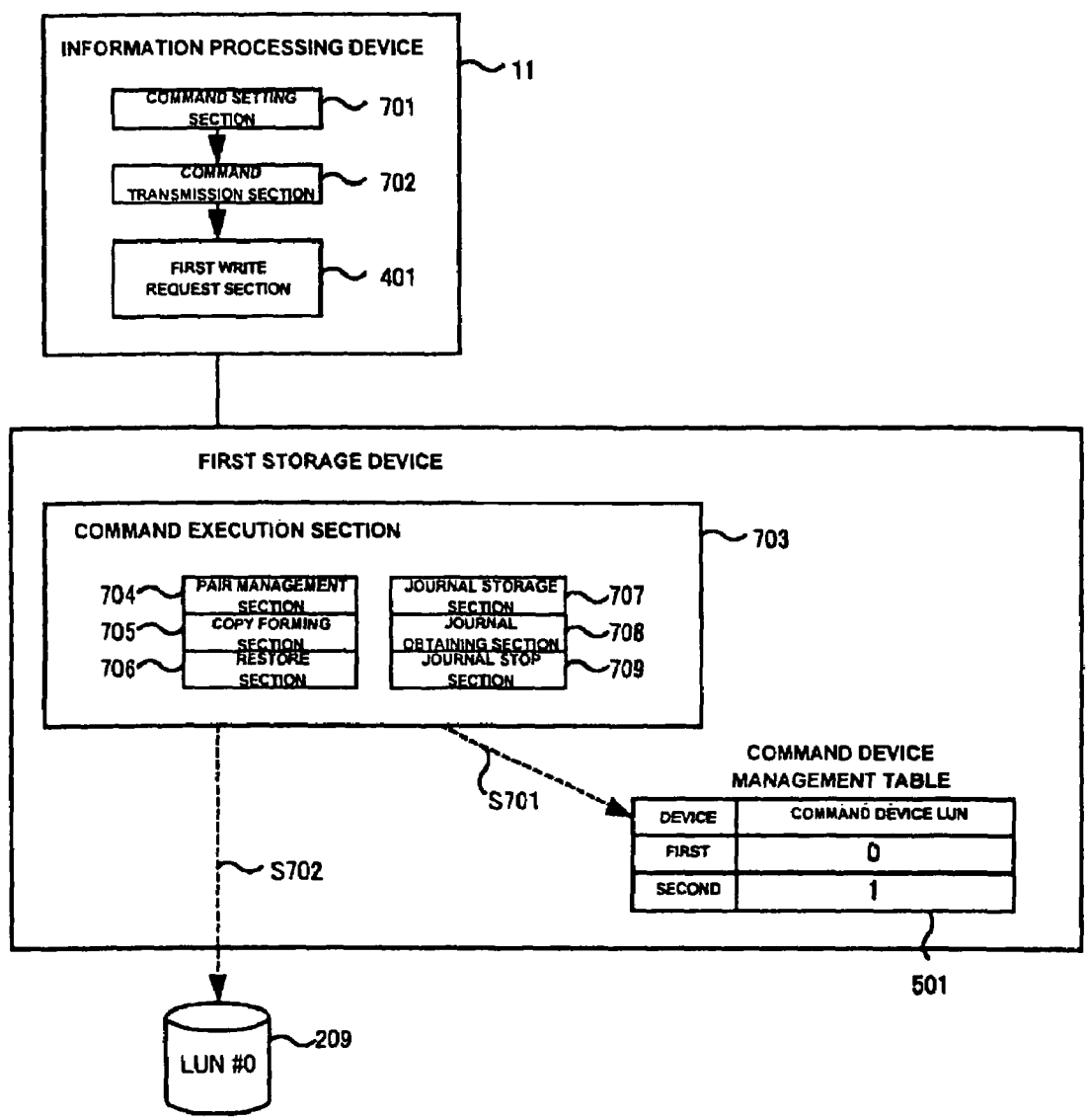
FIG. 7 is a schematic diagram illustrating execution of commands set at command devices in accordance with an embodiment of the present invention.

An outline of a process flow to execute a command using a command device will be described with reference to FIG. 7. The information processing device 11 is equipped with a command setting section 701 and a command transmission section 702. The command setting section 701 generates data that sets in a command interface 601 a "process number" of a command to be executed by the first storage device 10 and its "presence or absence of edited data." The command transmission section 702 transmits to the first write request section 401 a request to write the data in a first logical volume, which is a command device of the first storage device 10, according to a first communications protocol.

The first storage device 10 is equipped with a command execution section 703. The command execution section 703 is equipped with a pair management section 704, a copy forming section 705, a restore section 706, a journal storing section 707, a journal acquisition section 708 and a journal stop section 709, which control pairs of the logical volumes 209 to be described below.

The command execution section 703 refers to a command device management table 501, and obtains a LUN of a command device that corresponds to the first storage device 10 (S701). The command execution section 703 refers to the command device (S702) and, if data in the form of the command device interface 601 exists, executes a command designated by a process number indicated in the data.

Figure 8:
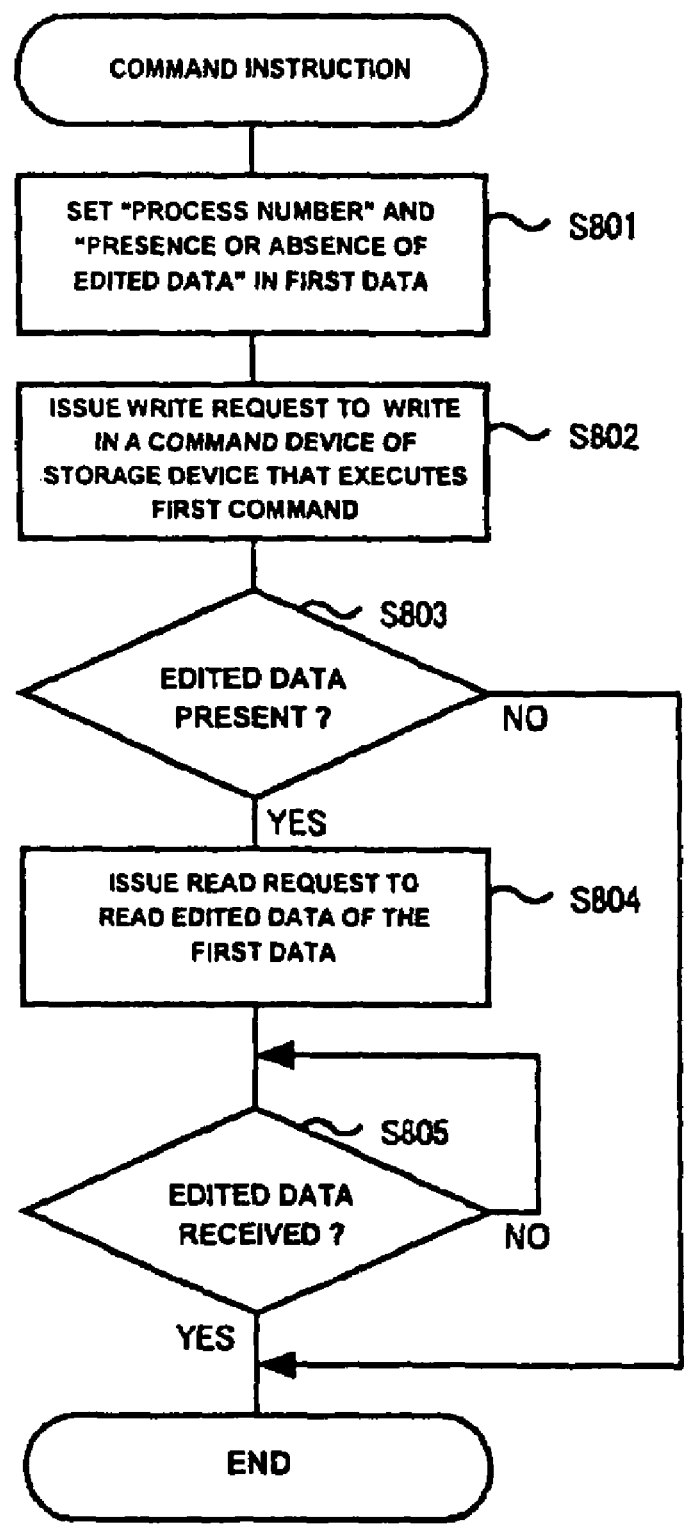
FIG. 8 shows a flowchart of an operation to control a command device in an information processing device in accordance with an embodiment of the present invention.
Figure 9:
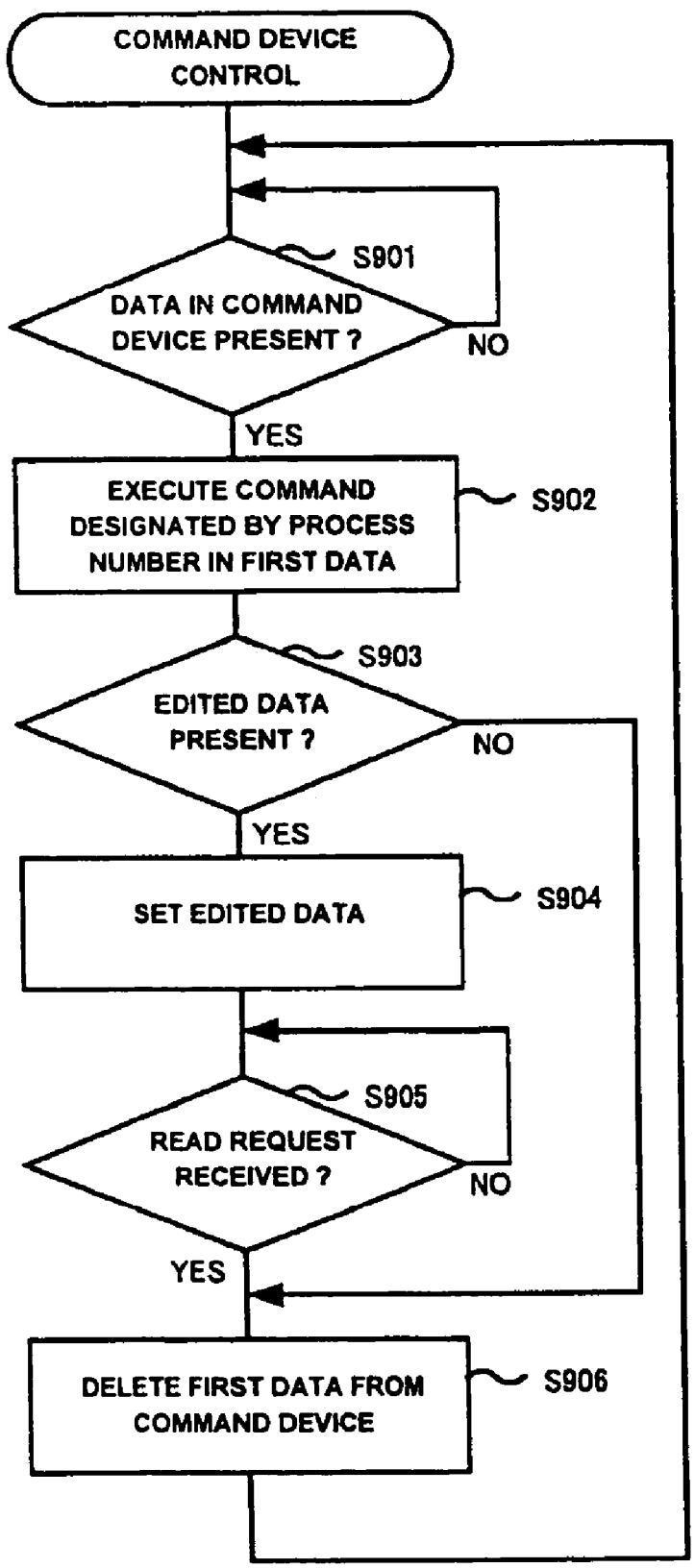
FIG. 9 shows a flowchart of an operation to control a command device in a storage device in accordance with an embodiment of the present invention.

Referring to flow charts in FIGS. 8 and 9, processes executed by the information processing device 11 and the storage devices 10 and 20 will be described. First, the information processing device 11 sets a "process number" and a "presence or absence of edited data" in first data in the form of the command device interface 601 (S801). Then, the information processing device 11 refers to a command device management table 501 stored in the storage device 10, and obtains a LUN of a relevant command device of a storage device which executes the command. In order to write the created first data at the LUN obtained, the information processing device 11 transmits to the storage device 10 a write request designating the LUN (S802).

Upon receiving the write request, the storage device 10 writes the first data in the command device at the designated LUN.

It is noted that command devices are logical devices that are defined on storage areas of a plurality of storage devices, like the logical volumes 209, and write requests to the command devices are transmitted based on the same communications protocol as that for write requests transmitted to the logical volumes 209.

The storage device 10 refers to the command device management table 501, to specify LUNs of command devices that the storage device 10 itself should refers to, and monitors whether or not the command devices have data written therein (S901). When the first data is found written in any of the command devices under observation, the storage device 10 executes the command designated by the process number in the first data (S902). Having completed the execution of the command, the storage device 10 confirms whether edited data of the first data is present or absent (S903). When edited data is absent, the storage device 10 deletes the first data from the command device (S906). When edited data is present, the storage device 10 sets data outputted as a result of execution of the command as edited data (S904).

The information processing device 11 confirms whether edited data for the command is present or absent (S803); and transmits to the storage device 10 a read request to read the edited data of the first data when the edited data is present (S804). Upon receiving the edited data from the storage device 10 (Yes at S805), the information processing device 11 completes the processing. It is noted that the read request is transmitted based on the same communications protocol for read requests for the logical volumes 209 other than the command device.

When the edited data exists, after receiving the read request for the edited data from the information processing device 11 (S905), the storage device 10 deletes the first data from the command device (S906).

In this manner, read or write requests that are used by the information processing device 11 for reading or writing data from and to ordinary logical volumes of the storage device 10, the information processing device 11 can transfer commands to the storage device 10.

Also, by using the virtual volumes, the information processing device 11 can transfer commands to the second storage device 20 through the first storage device 10, such that the second storage device 20 can execute the commands.

It is noted that, when the information processing device 11 requests the storage device 10 and 20 to execute a "pair formation," "journal acquisition," "acquisition of processing state of journal," "restore" or "swap" processing to be described below, the information processing device 11 uses the virtual volumes and command devices.

[Pair Formation]

Next, a description will be made as to a method for storing a copy of data in the logical volume 209 of the first storage device 10 in the logical volume 209 of the second storage device 20.

Figures 10, 11:
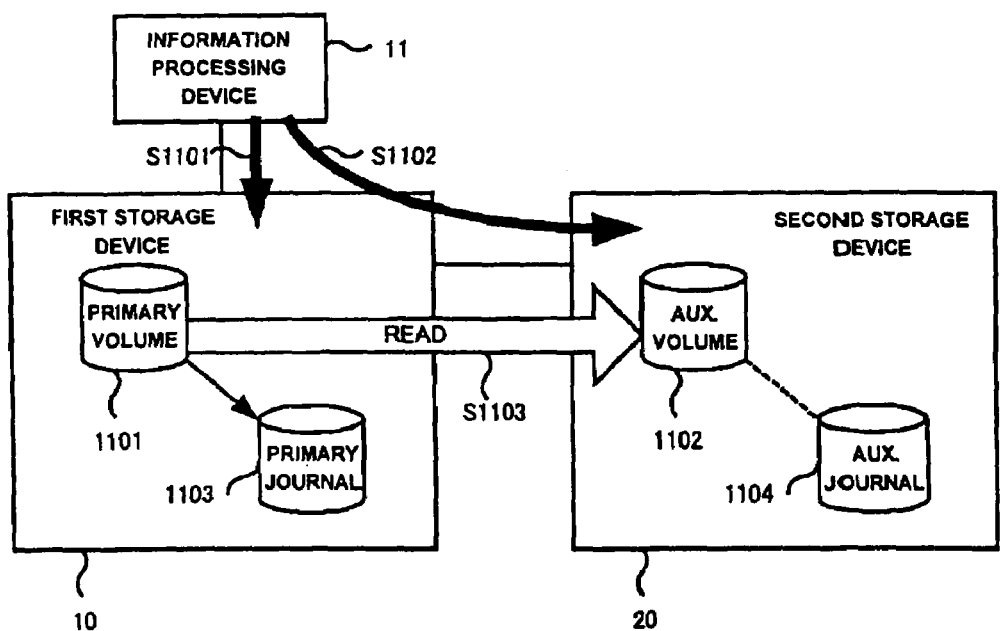
FIG. 10 shows a pair management table in accordance with an embodiment of the present invention.
FIG. 11 shows a schematic diagram illustrating a pair forming processing in accordance with an embodiment of the present invention.

FIG. 10 shows a pair management table 1001. In the pair management table 1001, a column of "COPY SOURCE DEVICE" indicates storage devices (10 or 20) to which those of the logical volumes of copy sources belong (hereafter referred to as "primary volumes"). A column of "COPY DESTIANTION DEVICE" indicates storage devices (10 or 20) to which those of the logical volumes of copy destinations belong (hereafter referred to as "auxiliary volumes"). Also, a column of "PRIMARY LUN" indicates LUNs of the corresponding primary volumes, and a column of "AUXILIARY LUN" indicates LUNs of the corresponding auxiliary volumes. Each correspondence between a primary volume and an auxiliary volume is called a "pair." Those of the logical volumes 209 for storing journals (to be described below) are assigned to the primary volumes and auxiliary volumes. A column of "PRIMARY JOURNAL LUN" sets LUNs of the logical volumes 209 of the journals assigned for the primary volumes (hereafter referred to as "primary journals"). A column of "AUXILIARY JOURNAL LUN" sets LUNs of the logical volumes 209 of the journals assigned for the auxiliary volumes (hereafter referred to as "auxiliary journals").

Any one of appropriate methods for assigning the logical volumes 209 for storing the journals can be used. For example, the user himself/herself may designate those of the logical volumes 209 to be used as the journals, or the information processing device 11 may select appropriate unused ones of the logical volumes 209.

Referring to FIG. 11, an example of a process flow in forming pairs will be described. In this example, it is assumed that the first storage device 10 is equipped with a third logical volume and a fifth logical volume, and the second storage device 20 is equipped with a fourth logical volume and a sixth logical volume. The information processing device 11 transmits a command to the first storage device 10 and the second storage device 20 for forming a pair of the third logical volume as being a primary volume 1101 and the fourth logical volume as being an auxiliary volume 1102, and a pair of the fifth logical volume as being a primary journal 1103 and the sixth logical volume as being an auxiliary journal 1104 (S1101, S1102). The pair management sections 704 of the first and second storage devices 10 and 20 store information indicating the states of the pairs in the pair management tables 1001 of the respective storage devices 10 and 20. The copy forming section 705 of the second storage device 20 transmits to the first storage device 10 a read request to read data in the primary volume; and upon receiving from the first storage device 10 a copy of the data in the primary volume, the second storage device 20 writes the data in the auxiliary volume (S1103). By this operation, the data in the primary volume and the data in the auxiliary volume can be matched with each other. A processing that brings the primary volume in conformity with the auxiliary volume by a pair forming instruction is called an "initial copy" processing.

Figure 12:
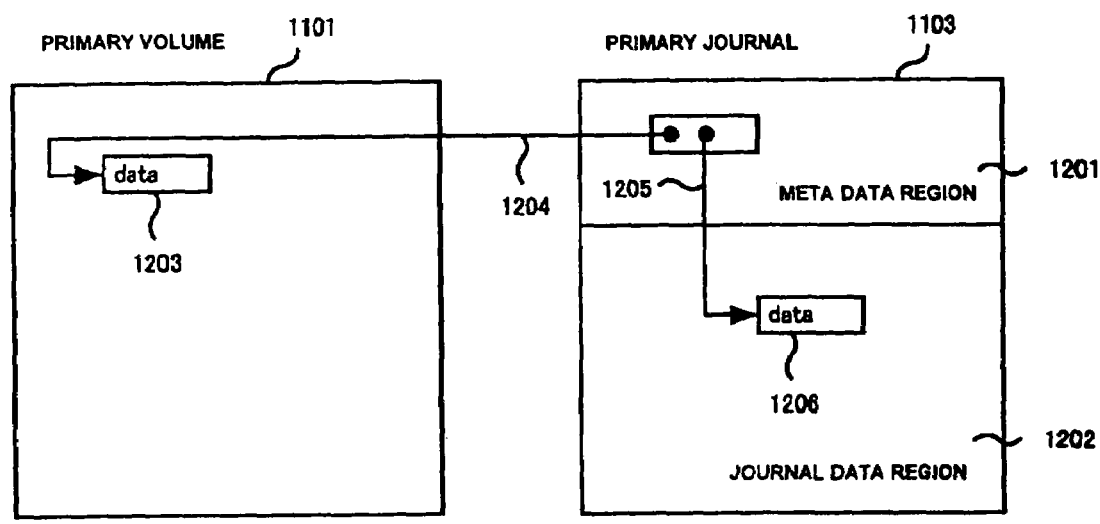
FIG. 12 shows a relation between a primary volume and a primary journal in accordance with an embodiment of the present invention.

Also, the journal storage section 707 of the first storage device 10 starts a processing to obtain a copy of the data written in the primary volume and its positional information in the primary journal. The correlation between the primary volume and the primary journal is described hereunder with reference to FIG. 12. The primary journal is composed of a meta data region 1201 and a journal data region 1202. The journal storage section 707 of the first storage device 10 stores a copy of the data written in the primary volume (hereafter referred to as "journal data") in the journal data region 1202. Also, the journal storage section 707 of the first storage device 10 stores in the meta data region 1201 the time when data 1203 is updated in the primary volume, LBA(s) 1204 of the data 1203, LBA(s) 1205 of the journal data 1206 in the corresponding journal data region, and the data length of the updated data. Also, the auxiliary journal is composed of a meta data region 1201 and a journal data region 1202 like the primary journal.

Also, by using a method similar to the above, a copy of data in the logical volume 209 of the second storage device 20 can be stored in the logical volume 209 of the first storage device 10 by an instruction from the information processing device 11.

As a result, without performing data communications between plural information processing devices, and without adding new commands to the operating system of the information processing device 11, data stored in a storage device at a primary site can be stored as a backup in a storage device at a remote site. Also, in accordance with the present embodiment, a storage device at a remote site transmits a read request to a storage device at a primary site to thereby perform a copy forming processing. By this, the processing load on the storage device at the primary site during the copy forming processing is alleviated. In other words, in a method in which a storage device at a primary site writes data in a storage device at a remote site, the storage device at the primary site needs to write the data in the storage device at the remote site after it confirms that the storage device at the remote site is ready for forming a pair. For this reason, the processing load on the storage device at the primary site becomes heavier, which would affect the overall performance of the primary site that is performing other primary processings. In contrast, in accordance with the present embodiment, since the storage device at the primary site only has to send data in response to a read request from the storage device at the remote site, the processing load at the storage device at the primary site can be alleviated.

[Restoration]

Even after the copy forming processing is performed, the first storage device 10 accepts write requests from the information processing device 11, and updates the data in the primary volumes. For this reason, the data in the primary volumes becomes inconsistent with the data in the auxiliary volumes. As described above, the primary journal stores journal data for executions performed even after the copy forming processing took place. In this respect, the second storage device 20 copies data stored in the primary journal into the auxiliary journal, and writes the data stored in the auxiliary journal into the auxiliary volumes, such that updates of the data on the primary volumes can be likewise performed on the auxiliary volumes.

Here, a processing to copy data stored in the primary journal into the auxiliary journal by the second storage device 20 is referred to as a "journal acquisition" processing, and a processing to write journal data stored in the auxiliary journal into the auxiliary volume is referred to as a "restoration" processing.

Figure 13:
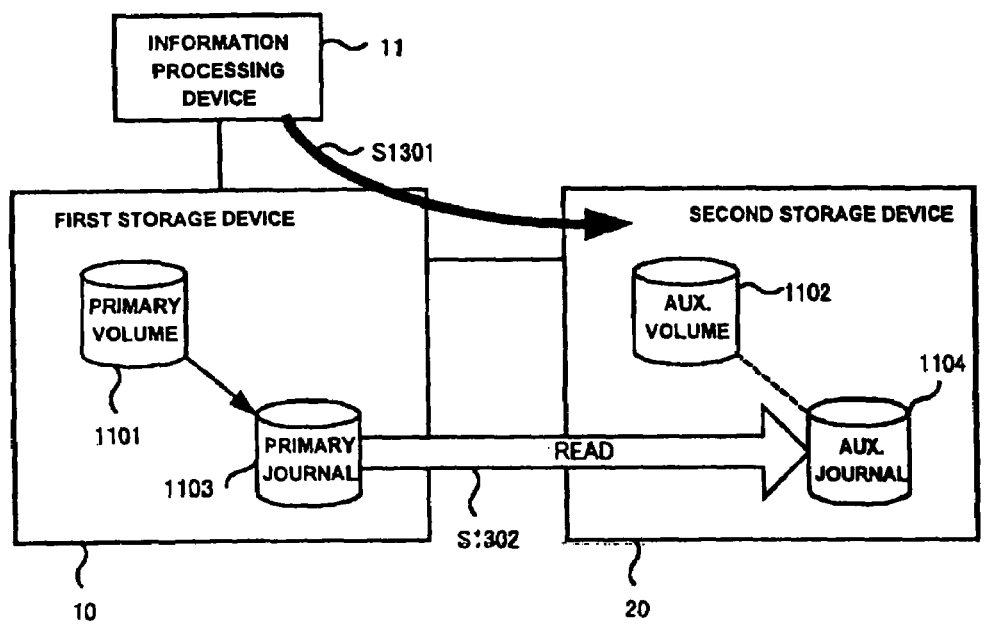
FIG. 13 is a schematic diagram illustrating a journal acquisition processing in accordance with an embodiment of the present invention.

FIG. 13 shows a flowchart of the journal acquisition processing. The information processing device 11 transmits a journal acquisition instruction to the second storage device 20 (S1301). Upon receiving the journal acquisition instruction, the journal acquisition section 708 of the second storage device 20 refers to the pair management table 1001, and obtains a primary journal LUN of the corresponding pair. The journal acquisition section 708 of the second storage device 20 transmits to the first storage device 10 a read request to read the primary journal. Upon receiving a copy of data of the primary journal, the journal acquisition section 708 of the second storage device 20 writes the data in the auxiliary journal (S1302).

Figure 14:
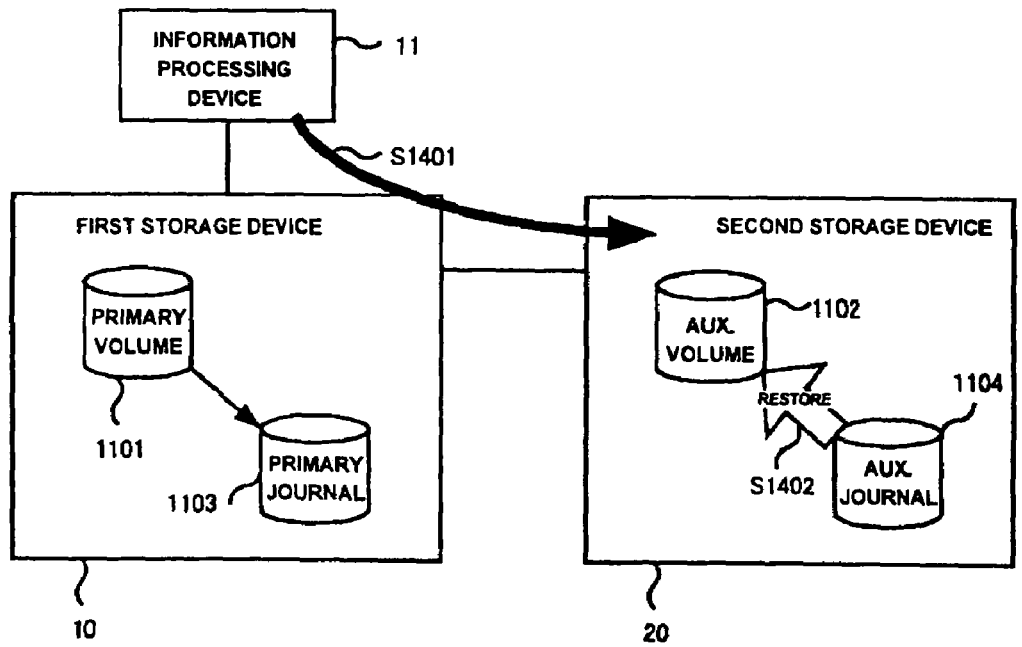
FIG. 14 is a schematic diagram illustrating a restoration processing in accordance with an embodiment of the present invention.

Next, referring to FIG. 14, a processing flow of a restoration processing will be described. The information processing device 11 transmits to the second storage device 20 a restore instruction to restore data in the auxiliary journal onto the auxiliary volumes (S1401). Upon receiving the restore instruction, the restore section 706 of the second storage device 20 writes journal data stored in the auxiliary journal into the auxiliary volumes (S1402).

Figure 15:
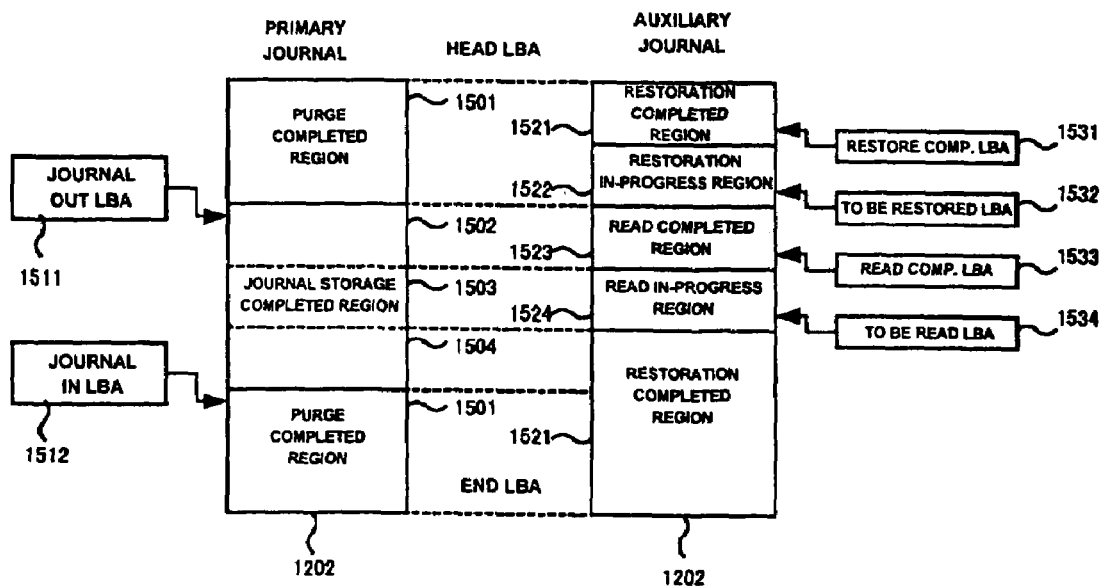
FIG. 15 shows journal data regions of a primary journal and an auxiliary journal in accordance with an embodiment of the present invention.

FIG. 15 shows journal data regions 1202 for the primary journal and the auxiliary journal. The journal data regions for the primary journal and the auxiliary journal are defined by the same head LBA and end LBA, respectively. The journal data region 1202 for the primary journal is composed of journal storage completed regions 1502, 1503 and 1504 which store journal data, and purge completed regions 1501 which do not store journal data.

The journal data region 1202 of the auxiliary journal is composed of restoration completed regions 1521 that store journal data that have already been used for restoration in the auxiliary volumes, restore in-progress region 1522 that stores journal data that are designated for restoration, read completed region 1523 that stores journal data that are not designated for restoration, and read in-progress region 1524 that stores journal data that are being read from the primary journal in response to a journal acquisition instruction.

Each of the storage devices 10 and 20 stores journal data in the journal data region 1202 from the head LBA to the end LBA in a chronological order as the journal data is created. When the journal data reaches the end LBA, each of the storage devices 10 and 20 returns to the head LBA again, and stores journal data from there. In other words, the storage devices 10 and 20 use the journal data regions cyclically between the head LBA and the end LBA.

The first storage device 10 that is equipped with the primary journal stores a journal-out LBA 1511 which is a head LBA of the journal storage completed regions 1502, 1503 and 1504, and a journal-in LBA 1512 which is a head LBA of the purge completed region 1501. When the journal-out LBA and the journal-in LBA are equal to each other, it means that journal data is not stored in the primary journal.

The second storage device 20 that is equipped with the auxiliary journal stores a restoration completed LBA 1531 which is the highest LBA of the restoration completed region 1521, a to-be restored LBA 1532 which is the highest LBA of the restore in-progress region 1522, a read completed LBA 1533 which is the highest LBA of the read completed region 1523, and a to-be read LBA 1534 which is the highest LBA of the read in-progress region 1524.

In other words, when the restoration completed LBA 1531 and the to-be restored LBA 1532 are equal to each other, it means that a restoration processing instructed by the information processing device 11 has been completed. Also, when the read completed LBA 1533 and the to-be read LBA 1534 are equal to each other, it means that a journal acquisition processing instructed by the information processing device 10 has been completed.

The information processing device 11 can transmit to the first storage device 10 and the second storage device 20 a request to obtain the processing state of journal. Each of the storage devices 10 and 20 confirms the states of LBAs that indicate the boundaries of the regions described above, and responds to the request.

Also, since the storage devices 10 and 20 use the journal data regions cyclically as described above, regions that become unnecessary need to be released. The processing to release a region is called a "purge" processing. Each of the storage devices 10 and 20 can perform a purge processing by changing addresses of LBAs that indicate the boundaries of the regions. The first storage device 10 can purge the journal storage completed region 1502, among the journal storage completed regions 1502, 1503 and 1504 of the primary journal, which the second storage device 20 has completed acquiring the journal data into the auxiliary journal. In this case, the first storage device 10 changes the journal-out LBA 1511 to the head LBA of the journal storage completed region 1503, such that the journal storage completed region 1502 becomes the purge completed region 1501. The second storage device 20 treats the restoration completed region 1521 of the auxiliary journal as a region that is purged, and stores the journal data obtained in response to the journal acquisition instruction in the restoration completed region 1521.

Figure 16:
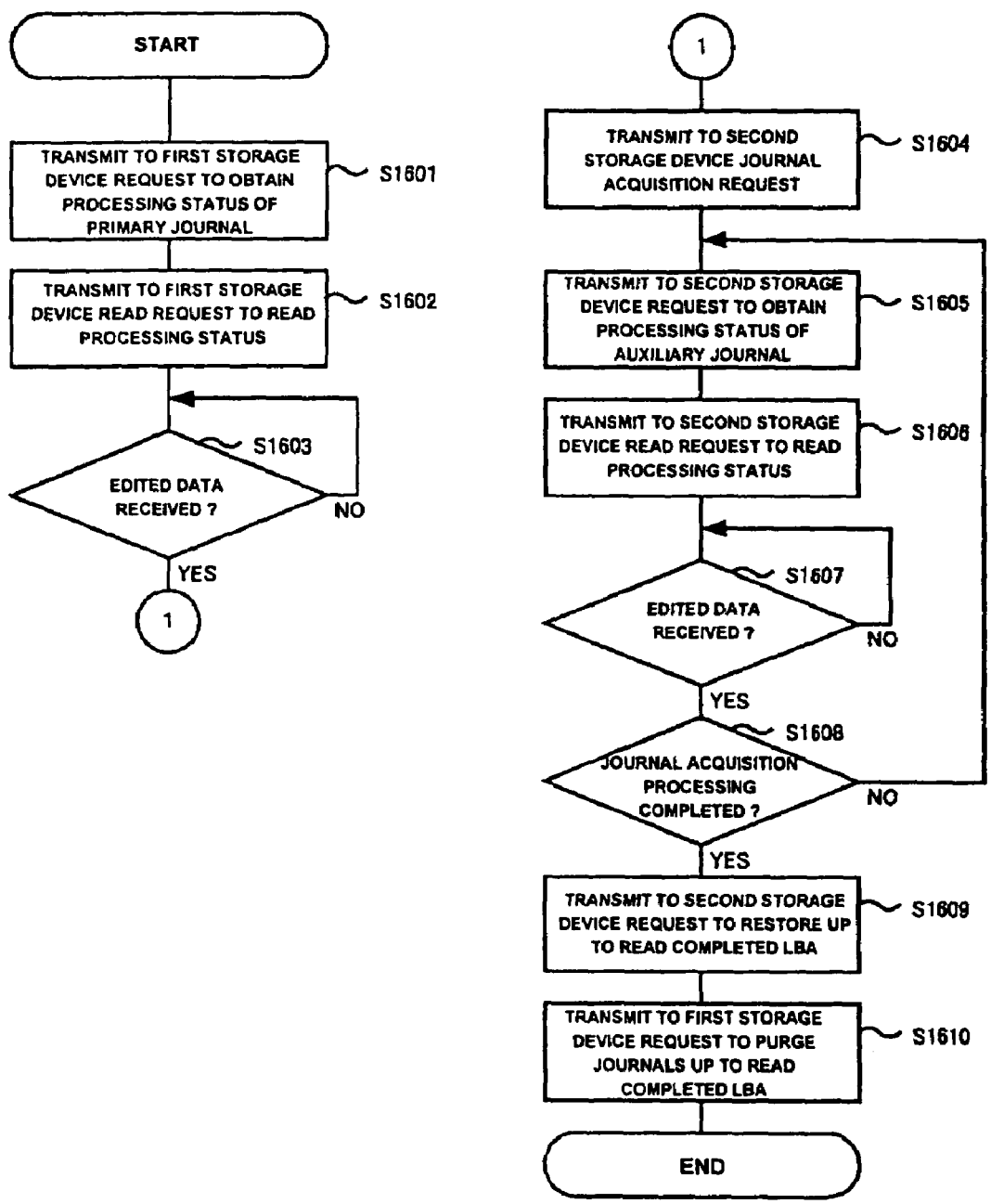
FIG. 16 shows a flowchart of a journal acquisition processing and a restore processing performed in information processing devices in accordance with an embodiment of the present invention.

Referring to a flowchart in FIG. 16, flows of the journal acquisition processing and the restoration processing will be described. The information processing device 11 transmits to the first storage device 10 a request to obtain the processing status of the primary journal (S1601). The information processing device 11 transmits to the first storage device 10 a read request to read edited data of a command device at which the processing status of the primary journal is set (S1602). Upon receiving the edited data of the command device from the first storage device 10 (S1603), the information processing device 11 transmits to the second storage device 20 a journal acquisition request to obtain journal data starting at the journal-out LBA 1511 to a LBA immediately before the journal-in LBA 1512 (S1604). The information processing device 11 transmits to the second storage device 20 a request to obtain the processing status of the auxiliary journal (S1605). The information processing device 11 transmits to the second storage device 20 a read request to read edited data of a command device at which the processing status of the auxiliary journal is set (S1606). Upon receiving the edited data of the command device from the second storage device 20 (S1607), the information processing device 11 compares the read completed LBA 1533 and the to-be read LBA 1534 set in the edited data, to confirm whether or not acquisition of the journal data has been completed (S1608). When the acquisition of the journal data has been completed, the information processing device 11 transmits to the second storage device 20 a restore request to restore journal data up to the read completed LBA 1533 (S1609). Then, the information processing device 11 transmits to the first storage device 10 a purge request to purge the journal data up to the read completed LBA 1533 (S1610). The information processing device 11 repeats the journal acquisition processing and restoration processing.

By the processings described above, updated data in a storage device at a primary site can be reflected on a storage device at a remote site without performing data communications between multiple information processing devices, and without adding new commands to the operating system of the information processing devices. It is noted that, with an instruction from the information processing device 11 that is communicatively connected to a storage device at a remote site, the storage device at the remote site can obtain journal data from a storage device at a primary site and restore the data.

[Swap]

Let us assume that a primary volume of the first storage device 10 and an auxiliary volume of the second storage device 20 form a pair by an instruction from an information processing device 11 (hereafter referred to as a "first information processing device") that is communicatively connected to the first storage device 10. In this case, if a failure occurs in the first information processing device 10, an information processing device 11 (hereafter referred to as a "second information processing device") that is communicatively connected to the second storage device 20 can continue processings that have been performed by the first information processing device, using the auxiliary volume of the pair. In this instance, the second information processing device switches the relation between the primary volume and the auxiliary volume. In other words, a pair is formed with the logical volume 209 of the second storage device 20 being a primary volume and the logical volume 209 of the first storage device 10 being an auxiliary volume. Such a processing to switch the pair relation is called a "swap" processing.

Figure 17:
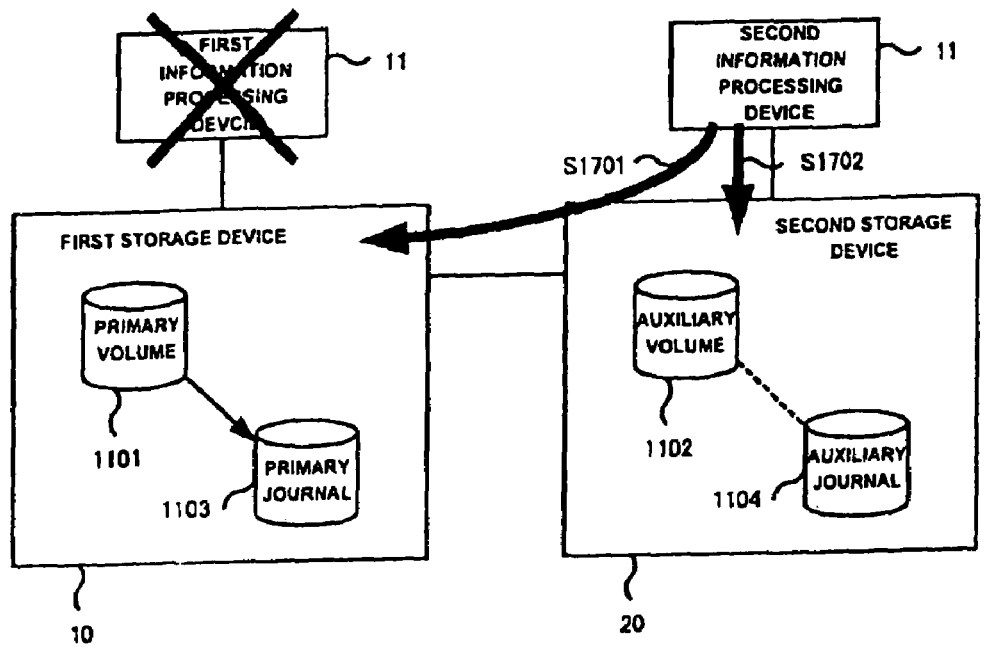
FIG. 17 is a schematic diagram illustrating a swap processing in accordance with an embodiment of the present invention.
Figure 18:
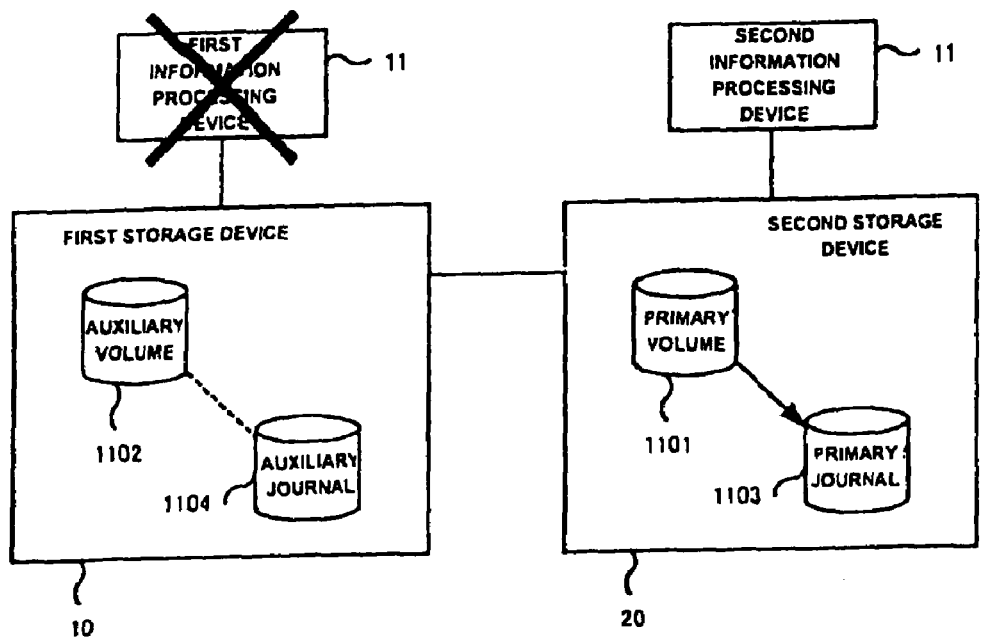
FIG. 18 is a schematic diagram illustrating a state in which the swap processing of the present embodiment is completed.

Referring to FIGS. 17 and 18, a flow of processings to swap a pair will be described. As shown in FIG. 17, the second information processing device 11 transmits a pair swap instruction to the first storage device 10 and the second storage device 20 (S1701, S1702). Upon receiving the pair swap instruction, the journal stop section of the first storage device 10 stops storing journals in the primary volume. Also, the pair management section 704 of the first storage device 10 swaps the primary volume and the auxiliary volume registered in the pair management table 1001. Similarly, the pair management section 704 of the second storage device 20 swaps the primary volume and the auxiliary volume registered in the pair management table 1001. The journal storage section 707 of the second storage device 20 starts storing journals of the logical volume 209 of the second storage device 20, which defines the primary volume.

FIG. 18 shows a state in which a pair is formed with the logical volume 209 of the second storage device 20 being the primary volume and the logical volume 209 of the first storage device 10 being the auxiliary volume, as a result of the swap processing performed by the first storage device 10 and the second storage device 20 which received the pair swap instruction.

Figure 19:
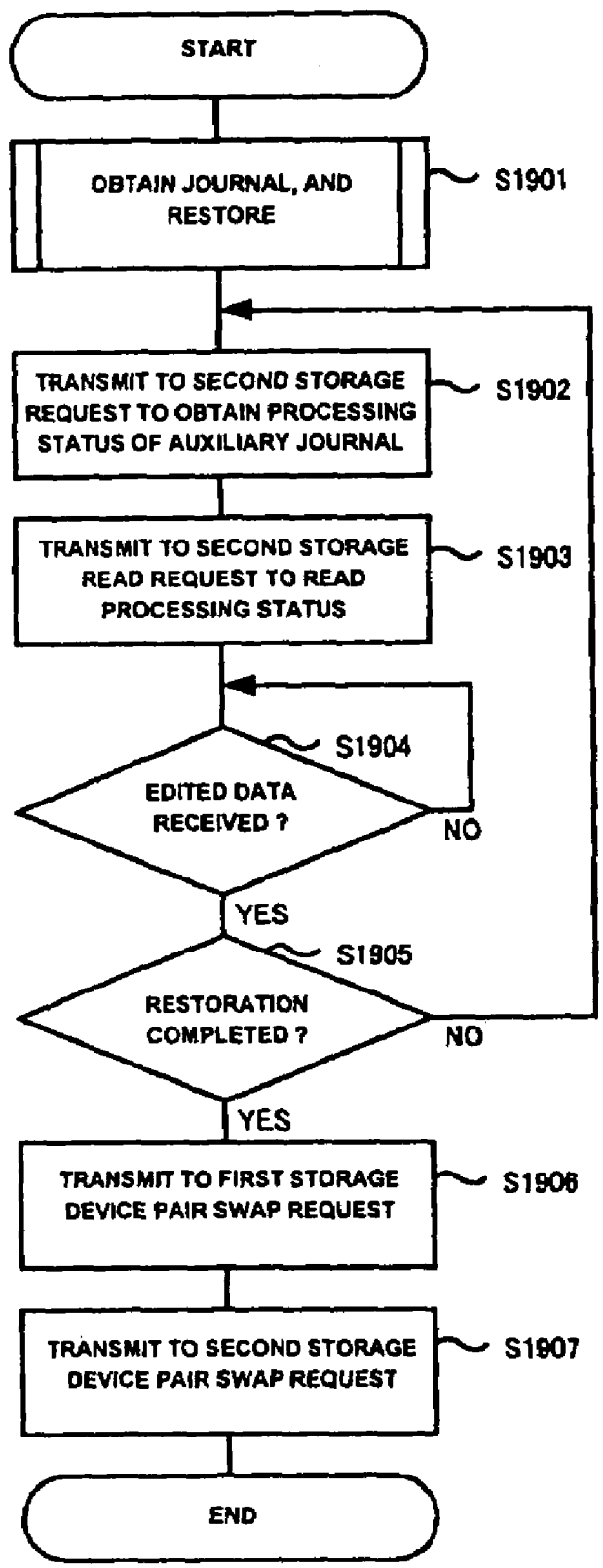
FIG. 19 shows a flowchart of a swap processing in a second information processing device in accordance with an embodiment of the present invention.
Figure 20:
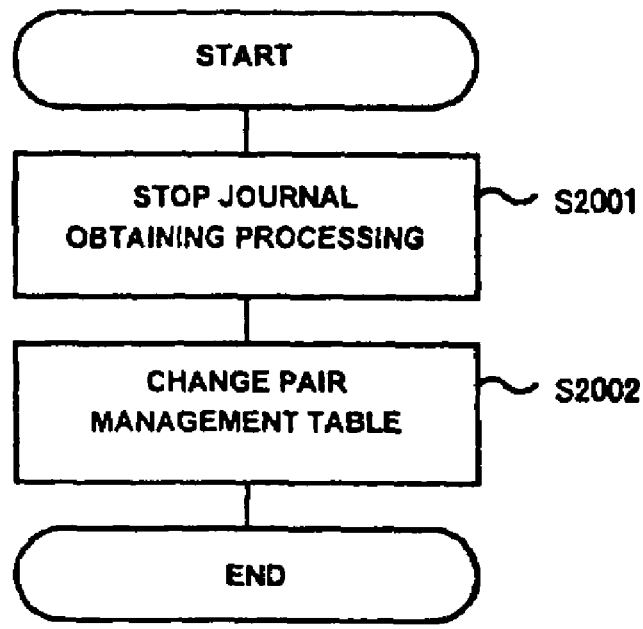
FIG. 20 shows a flowchart of a swap processing in a first storage device in accordance with an embodiment of the present invention.
Figure 21:
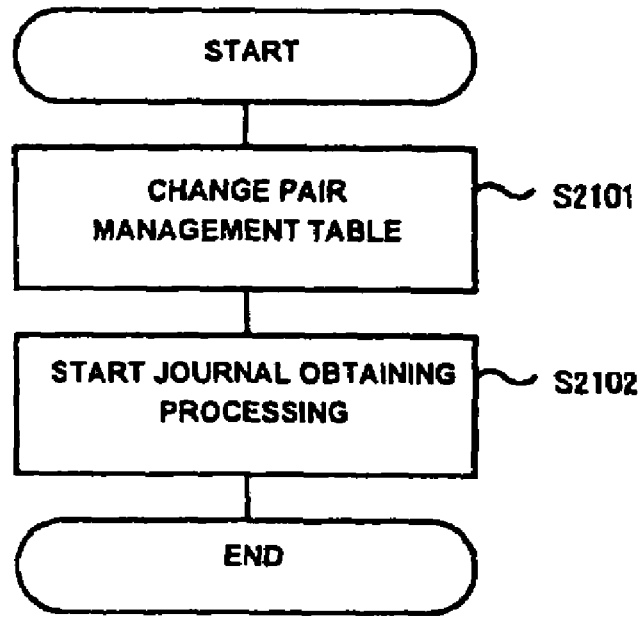
FIG. 21 shows a flow chart of a swap processing in a second storage device in accordance with an embodiment of the present invention.

The swap processing performed by the second information processing device 20 and the storage devices 10 and 20 will be described in detail with reference to flowcharts in FIGS. 19 through 21. The second information processing device executes the journal acquisition processing and the restoration processing described above (S1901). The second information processing device transmits to the second storage device 20 a request to obtain the processing status of the auxiliary journal (S1902). The second information processing device transmits to the second storage device 20 a read request to read edited data of a command device in which the processing status of the auxiliary journal is set (S1903). Upon receiving the edited data of the command device from the second storage device 20 (S1904), the second information processing device compares the restoration completed LBA 1531 and the to-be restored LBA 1532 set in the edited data, to confirm if the restoration processing has been completed (S1905). If the restoration has been completed, the second information processing device transmits a pair swap request to the first storage device 10 and the second storage device 20 (S1906, S1907). Upon receiving the pair swap request, the first storage device 10 stops its journal acquisition processing with respect to the primary volume (S2001), and swaps the relation between the copy source and the copy destination registered in the pair management table 1001 (S2002). Also, the second storage device 20, that has received the pair swap request, swaps the relation between the copy source and the copy destination registered in the pair management table 1001 (S2101), and starts a journal acquisition processing with respect to the primary volume of the second storage device 20 (S2102).

Let us consider as an example an information processing system that is composed of a primary site and a remote site. The primary site is equipped with a first information processing device and a first storage device 10, and the remote site is equipped with a second information processing device and a second storage device 20. When a failure occurs in the first information processing device, the second information processing device uses the second storage device 20 to continue primary processings performed at the primary site. The second information processing device may instruct the first storage device 10 and the second storage device 20 to execute the swap instruction described above, such that the second storage device 20 is used for the primary processings, and data on the second storage device 20 can be stored as a backup in the first storage device 10. Furthermore, since the data on the second storage device 20 is stored as a backup in the first storage device 10, the execution of the primary processings can be quickly switched to the primary site, when the first information processing device is recovered from the failure.

Also, since the pair swap instructions from the information processing device 11 to the storage devices 10 and 20 are provided using read/write commands with which the information processing device 11 is equipped, there is no need to add new commands to the operating system on the information processing device 11.

[Three-site Structure with Command Device System]

The storage device system described above transfers commands between two storage devices using virtual volumes and command devices. Furthermore, a virtual volume structure can be set up among three or more storage devices so that commands can be transferred among three or more storage devices.

Figure 22:
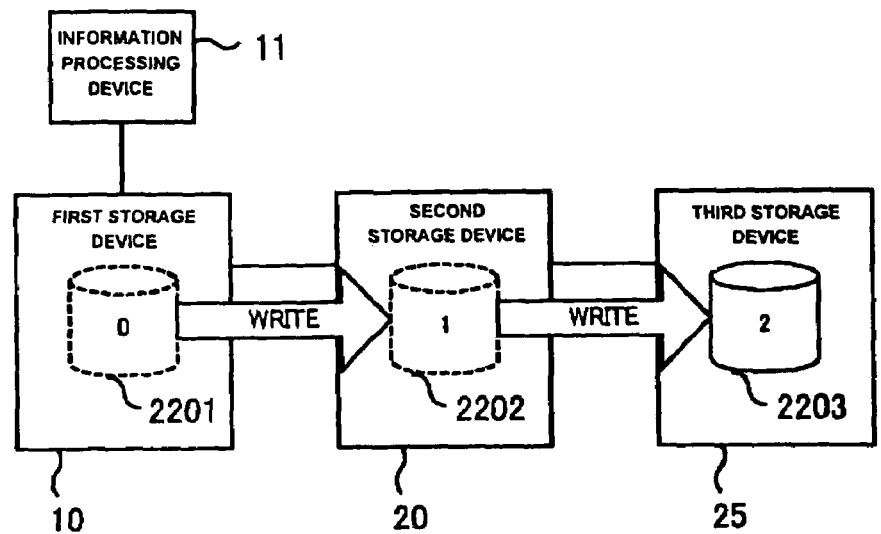
FIG. 22 schematically shows a diagram of an information processing system in accordance with an embodiment of the present invention in which a command is sent to a third storage device.

FIG. 22 shows a storage device system in accordance with an embodiment of the present invention, which includes, for example, a first storage device 10, a second storage device 20 and a third storage device 25.

A logical volume 2201 of the first storage device 10 is a virtual volume of a logical volume 2202 of the second storage device 20, the logical volume 2202 of the second storage device 20 is a virtual volume of a logical volume 2203 of the third storage device 25. A third logical volume 2203 is a command device. By connecting the virtual volumes in this manner, commands can be transferred from an information processing device 11 to the third storage device 25.

Figure 23:
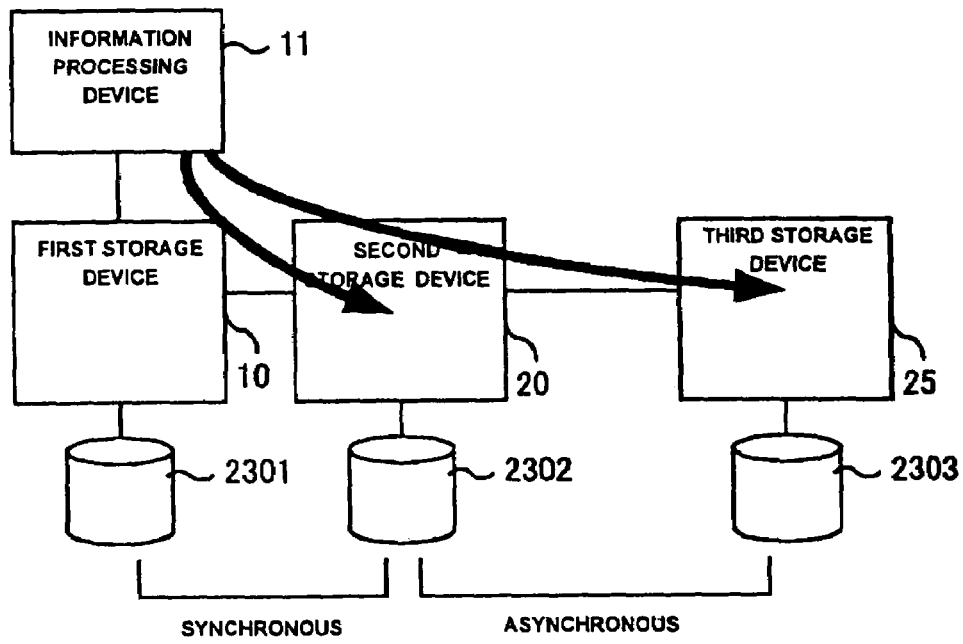
FIG. 23 schematically shows a diagram of an information processing system in accordance with an embodiment of the present invention in which a command is sent to a second storage device and a third storage device.

Accordingly, by using the single information processing device 11 and three storage devices 10, 20 and 25, a storage device system that can handle disaster recovery can be structured. FIG. 23 indicates the storage device system.

The first storage device 10, the second storage device 20 and the third storage device 25 are equipped with logical volumes 2301, 2302 and 2303, respectively. In this example, the logical volume 2301 of the first storage device 10 and the logical volume 2302 of the second storage device 20 form a synchronous pair with the logical volume 2301 of the first storage device as being a primary logical volume.

The following is a description of the synchronous pair. FIG. 24 indicates a synchronous pair management table 2401. The synchronous pair management table 2401 is equipped with entries of "COPY SOURCE DEVICE," "COPY DESTINATION DEVICE," "PRIMARY LUN," and "AUXILIARY LUN." When the logical volume 2301 of the first storage device 10 and the logical volume 2302 of the second storage device 20 form a synchronous pair, the first storage device 10 is set as a copy source device, the second storage device 20 as a copy destination device, a LUN of the logical volume 2301 of the first storage device 10 as a primary LUN, and a LUN of the logical volume 2302 of the second storage device 20 as an auxiliary LUN.

Upon receiving a data write request from the information processing device 11 to write data in the logical volume 2301 of the first storage device 10, which is a primary volume, the first storage device 10 refers to the synchronous pair management table 2401, and sends the data write request to the second storage device 20 to write the data in the logical volume 2302 of the second storage device 20, which is an auxiliary volume corresponding to the primary volume. Upon receiving a data write completion notification for the data write request from the second storage device 20, the first storage device 10 sends the data write completion notification to the information processing device 11. In other words, when the write completion notification is sent to the information processing device 11, the same data have been written in the primary volume and the auxiliary volume. Accordingly, by using the synchronous pair, data can be backed up in the second storage device 20, without losing the data of the first storage device 10. However, in making a synchronous pair, if there is a great distance between the first storage device 10 and the second storage device 20, transmission of a write completion notification to the information processing device 11 may be delayed, and the processing by the information processing device 11 may be affected.

Accordingly, a synchronous pair is formed when the first storage device 10 and the second storage device 22 are located in a short distance from each other, and a pair using the journals described above (hereafter referred to as an "asynchronous pair") is formed with the second storage device 20 and the third storage device 25. The information processing device 11 sends to the second storage device 20 and the third storage device 25 a command to form a pair with the logical volume of the second storage device 20 being as a primary volume and the logical volume of the third storage device 25 as being an auxiliary volume, using the virtual volumes and command devices. After the pair is formed, the information processing device 11 sends a command to obtain and restore a journal in the pair to the third storage device 25, by using the virtual volumes and the command devices. Accordingly, data of the first storage device 10 can be backed up in the third storage device 25 that may be installed at a great distance from the first storage device 10. Also, neither the third storage device 25 nor the second storage device 20 that is located intermediate between the first and third storage devices 10 and 25 requires an information processing device. It is noted that an information processing device for backup may be connected to the third storage device 25, and processings may be continued using data in the third storage device 25 when the first storage device 10 fails.

A data backup method in which commands are transferred among storage devices by using virtual volumes and command devices is described above. In the description above, the information processing device 11 sends commands to the storage devices 10, 20 and 25. However, each of the storage devices 10, 20 and 25 may be equipped with a command setting section 701 and a command transmission section 702. For example, in the structure indicated in FIG. 23, the first storage device 10 can send a command to be executed at the third storage device 25 to the command device of the third storage device 25 via the virtual volume of the second storage device 20. By this, for example, the first storage device 10 can send to the third storage device 25 a command to confirm the status of the third storage device 25, such that the first storage device 10 can detect the status, such as, a failure of the third storage device 25. If a failure occurs in the third storage device 25, the first storage device 10 can send to the second storage device 20 and the third storage device 25 a command to cancel the above-described asynchronous pair between the second storage device 20 and the third storage device 25.

[Method for Designating Transfer Destination Address]

Next, a method to designate an address of a storage device of a transfer destination at the time of transferring a command. FIG. 25 indicates a path information management table 2501 that is stored in the information processing device 11. The path information management table 2501 includes columns of "DEVICE" and "PATH." In the "DEVICE" column, addresses of the storage devices 10 and 20 are stored. For example, an address may be information that is composed of a product serial number, a port number and the like of each of the storage devices 10 and 20. The "PATH" column stores information indicating as to how each of the storage devices 10 and 20 is connected to the information processing device. For example, according to the path information management table 2501 shown in FIG. 25, the path to the first storage device 10 is indicated as being "DIRECT" and the path to the second storage device 20 is indicated as being "FIRST." This means that the information processing device 11 is directly connected to the first storage device 10, and is connected to the second storage device 20 through the first storage device 10.

FIG. 26 shows a command interface 2601 which is a data format used when transferring a command from the information processing device 11 to the storage devices 10 and 20. The command interface 2601 is composed of an identification number, a transfer destination parameter, a control parameter and an input parameter. The identification number is a number for identifying the data, which is appended by the information processing device 11 when generating the data. Addresses of the storage devices 10 and 20 to which the data is sent are set at the transfer destination parameter. The control parameter and the input parameter set parameters similar to those of the command device interface 601 that is used in the command device.

Figure 27:
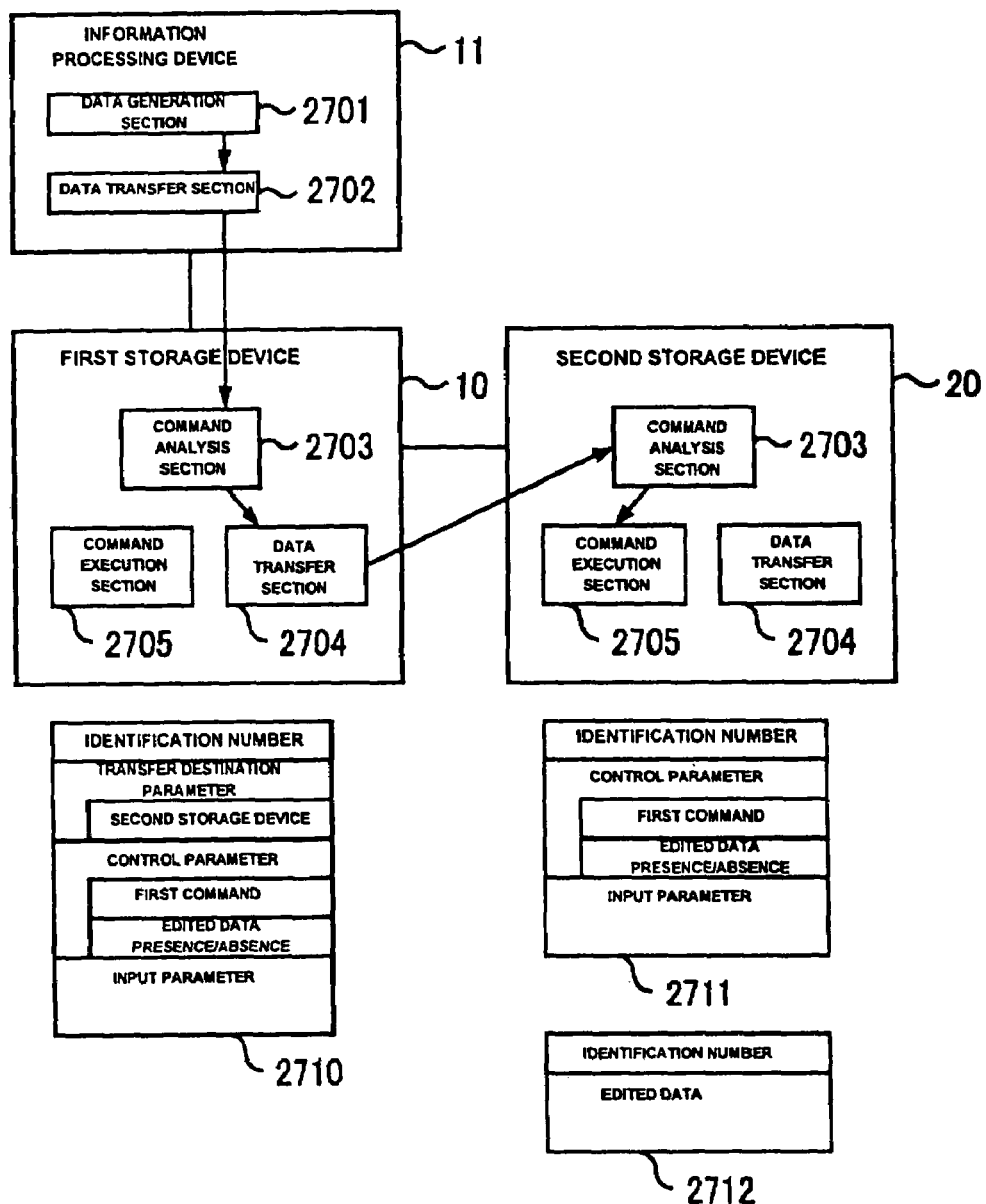
FIG. 27 schematically shows a diagram illustrating a storage device system in which an information processing device sends a command to a second storage device, using a command interface in accordance with an embodiment of the present invention.

An outline of processings to be executed when the information processing device 11 transfers a command to the second storage device 20 will be described with reference to FIG. 27. The information processing device 11 is equipped with a data generation section 2701 and a data transfer section 2702. Each of the storage devices 10 and 20 is equipped with a command analysis section 2703, a data transfer section 2704 and a command execution section 2705.

The data generation section 2701 of the information processing device 11 refers to the path information management table 2501, refers to the path to the second storage device 20, and recognizes that the second storage device 20 is connected via the first storage device 10. The data generation section 2701 generates data 2710 in the command interface 2601 format in which the address of the second storage device 20 is set as a transfer destination address and a first command is set at a process number. The data generation section 2701 notifies the data transfer section 2702 to transfer the data 2710 to the first storage device 10. The data transfer section 2702 transfers the data 2710 to the first storage device 10.

The command analysis section 2703 of the first storage device 10, upon receiving the data 2710, notifies the data transfer section 2704 of the first storage device 10 to transfer the data 2710 to the second storage device 20 that is set as the transfer destination address. The data transfer section 2704 of the first storage device 10 generates data 2711 by deleting the transfer destination parameter from the data 2710, and transfers the data 2711 to the second storage device 20. The command analysis section 2703 of the second storage device 20, upon receiving the data 2711, obtains the first command from the command parameter, as the data 2711 does not contain a transfer destination parameter. The command analysis section 2703 of the second storage device 20 notifies the command execution section 2705 of the second storage device 20 to execute the first command. The command execution section 2705 of the second storage device 20, upon receiving the notification from the command analysis section 2703, executes the first command.

When the first command causes an output result, the command execution section 2705 of the second storage device 20 stores the output result as edited data 2712. In this example, the same identification number is appended to all of the data 2710, 2711 and 2712. When the first command causes an output result, the information processing device 11 can obtain the output result of the first command by designating an identification number at the first storage device 10 and sending a send command to send the edited data 2712.

[Method for Designating Transfer Destination Address in Three-site Structure]

The method for transferring a command between two storage devices by designating a transfer destination address has been described above. Further, a command can be transferred among three or more storage devices by designating multiple transfer destination addresses.

Figures 28, 29:
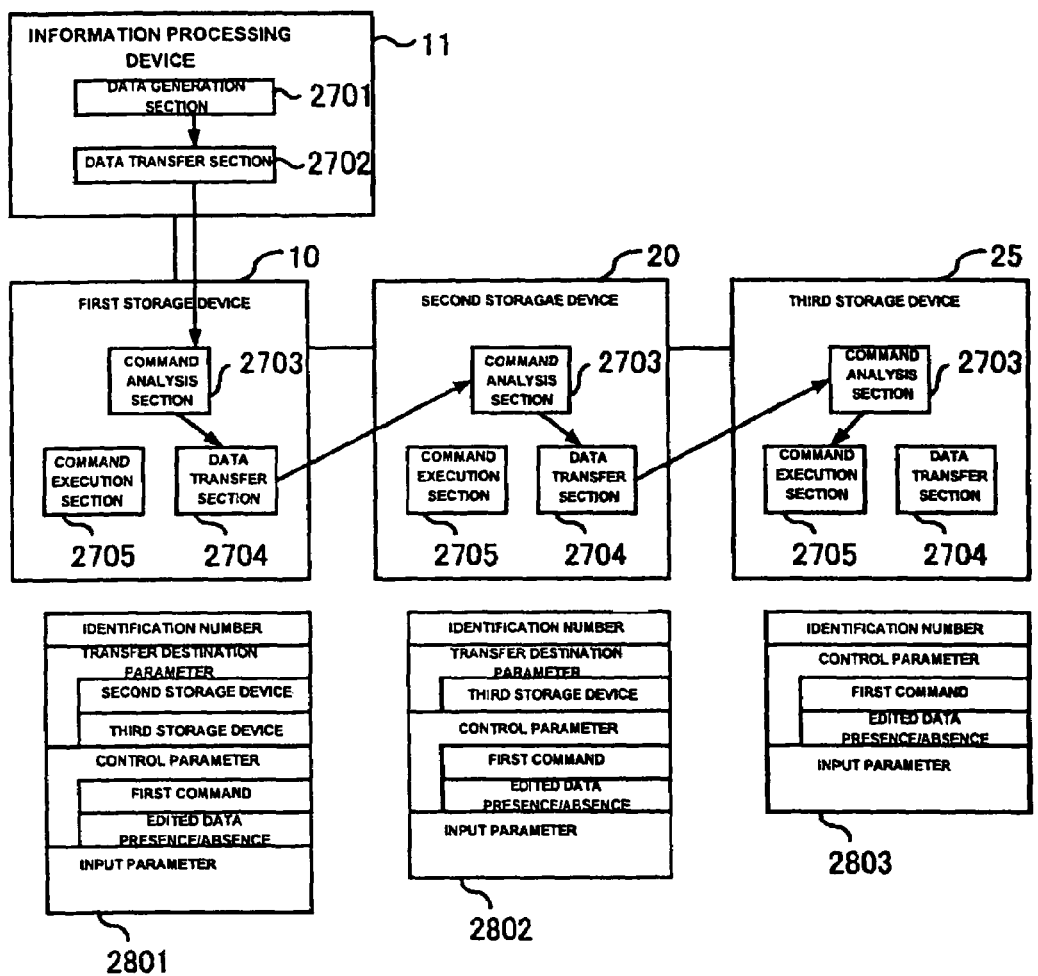
FIG. 28 schematically shows a diagram illustrating a storage device system in which an information processing device sends a command to a third storage device, using a command interface in accordance with an embodiment of the present invention.
FIG. 29 shows an example of a path information management table that sets a third storage device in accordance with an embodiment of the present invention.

FIG. 28 shows a flow of processings to transfer a command among three storage devices, i.e., the first storage device 10, the second storage device 20 and the third storage device 25. The information processing device 11 is communicatively connected to the first storage device 10, the first storage device 10 is communicatively connected to the second storage device 20, and the second storage device 20 is communicatively connected to the third storage device 25. In this example, the path information management table 2501 of the information processing device 11 sets paths indicated in FIG. 29.

A process flow in which the information processing device 11 transfers a first command to the third storage device 25 is described below. The data generation section 2701 of the information processing device 11 refers to the path information management table 2501 and recognizes that the third storage device 25 is connected via the first storage device 10 and the second storage device 20. The data generation section 2701 generates data 2801 in the command interface 2601 format in which the second storage device 20 and the third storage device 25 are set as transfer destination addresses, and a first command is set as a process number. The data generation section 2701 notifies the data transfer section 2702 to transfer the generated data to the first storage device 10 that is at the head address in the transfer path. The data transfer section 2702, upon receiving the notification, sends the data 2801 to the storage device 10.

The command analysis section 2703 of the first storage device 10, upon receiving the data 2801, obtains the address of the second storage device 20 which is set at the head of the transfer destination parameter, and notifies the data transfer section 2704 of the first storage device 10 to send the data to the second storage device 20. The data transfer section 2704, upon receiving the notification, generates data 2808 by deleting the transfer destination address of the second storage device 20 from the data 2801, and sends the data 2802 to the second storage device 20.

The second storage device 20 obtains the address of the third storage device 25 which is set at the head of the transfer destination parameter just as does the first storage device 10, generates data 2803 by deleting the third storage device 25 from the transfer destination parameter, and sends the data 2803 to the third storage device 25.

The command analysis section 2703 of the third storage device 25, upon receiving the data 2803, obtains the process number of the first command from the control parameter as the data 2803 does not contain a transfer destination address, and notifies the command execution section 2705 of the third storage device 25 to execute the first command. The command execution section 2705 of the third storage device 25, upon receiving the notification, executes the first command.

In this manner, by setting multiple transfer destination addresses in the transfer destination parameter, a command can be transferred among three or more storage devices.

[Processings of Method for Designating Transfer Destination Address]

Figure 30:
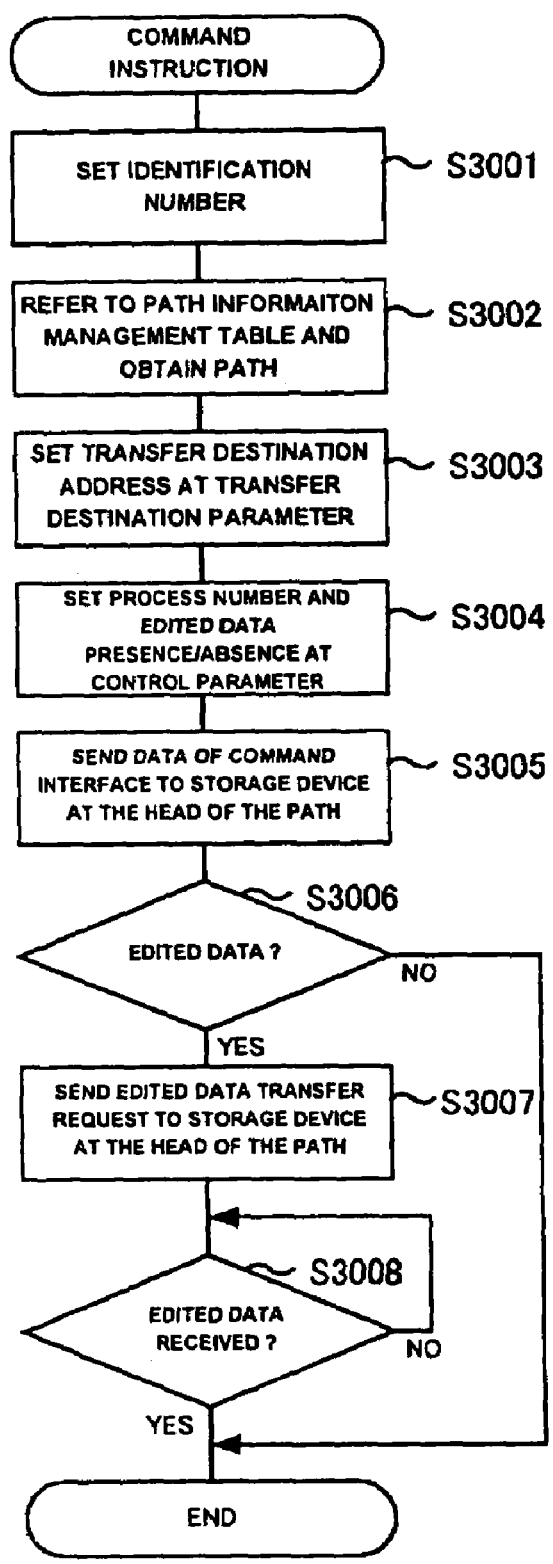
FIG. 30 shows a flowchart of processings in which an information processing device sends a command to a storage device, using a command interface in accordance with an embodiment of the present invention.

FIG. 30 shows a flowchart of processings executed by the information processing device 11 when a command is transferred with a transfer destination address being designated.

First, the information processing device 11 generates an identification number and sets the identification number in a command interface 2601 (S3001). The identification number can be any number that can uniquely identify the command interface 2601 generated. The information processing device 11 refers to the path information management table 2501, and obtains a path for a storage device to which a command is to be transferred (S3002). The information processing device 11 sets one or multiple transfer destination addresses at the transfer destination parameter based on the path information obtained (S3003). Next, the information processing device 11 sets a process number of the is command to be executed by the storage device at the transfer destination and a presence/absence of edited data of the command (S3004). Then, the information processing device 11 sends the data of the command interface 2601 to a storage device at the head address in the transfer path (S3005). The information processing device 11 confirms whether the command results in edited data (S3006), and ends the processing when no edited data exists. When edited data exists, the information processing device 11 designates the identification number and sends an edited data send request to the storage device at the head address in the transfer path (S3007). The information processing device 11 waits until it receives the edited data (S3008), and ends the processing upon receiving the edited data.

Figure 31:
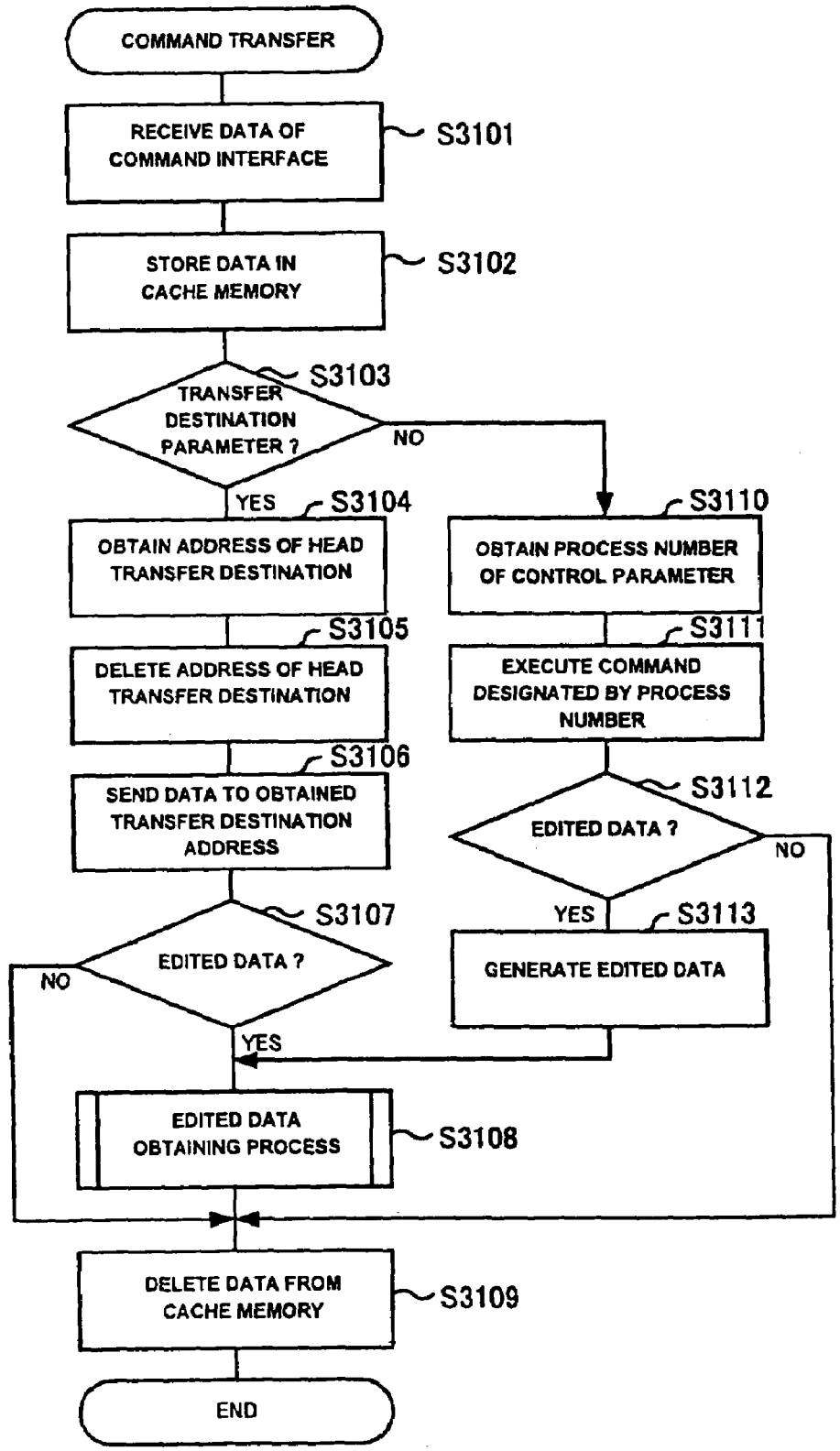
FIG. 31 shows a flowchart of processings in which a storage device sends or executes a command, using a command interface in accordance with an embodiment of the present invention.

FIG. 31 shows a flowchart of processings performed at the storage devices 10, 20 and 25, when a command is transferred with a transfer destination address being designated.

Each of the storage devices 10, 20 and 25 may perform the following processings. Upon receiving the data of the command interface (S3101), each storage device stores the data in a cache memory (S3102). The storage device confirms whether the data contains a transfer destination parameter (S3103). If the transfer destination parameter exists, the storage device obtains a transfer destination address at the head of the transfer destination parameter (S3104). Next, the storage device deletes the transfer destination address at the head of the transfer destination parameter from the data (S3105), and sends the data to the transfer destination address previously obtained (S3106). The storage device confirms whether the command results in edited data (S3107). If edited data exists, the storage device executes a processing to obtain the edited data (S3108), deletes the data from the cache memory (S3109), and ends the processing. If no edited data exists, the storage device does not perform the processing to obtain edited data, deletes the data from the cache memory (S3109), and ends the processing.

When a transfer destination parameter is not set in the received command interface 2601, the storage device (which may be 10, 20 or 25) obtains a process number of the control parameter (S3110), and executes a command designated by the process number (S3111). The storage device (10, 20, 25) confirms whether the command results in edited data (S3112). If edited data exists, the storage device (10, 20, 25) generates edited data set with the identification number set in the command interface 2601 (S3113), executes a process to obtain edited data (S3108), deletes the data from the cache memory (S3109), and ends the processing. If edited data does not exist, the storage device (10, 20, 25) deletes the data from the cache memory (S3109) and ends the processing.

Figure 32:
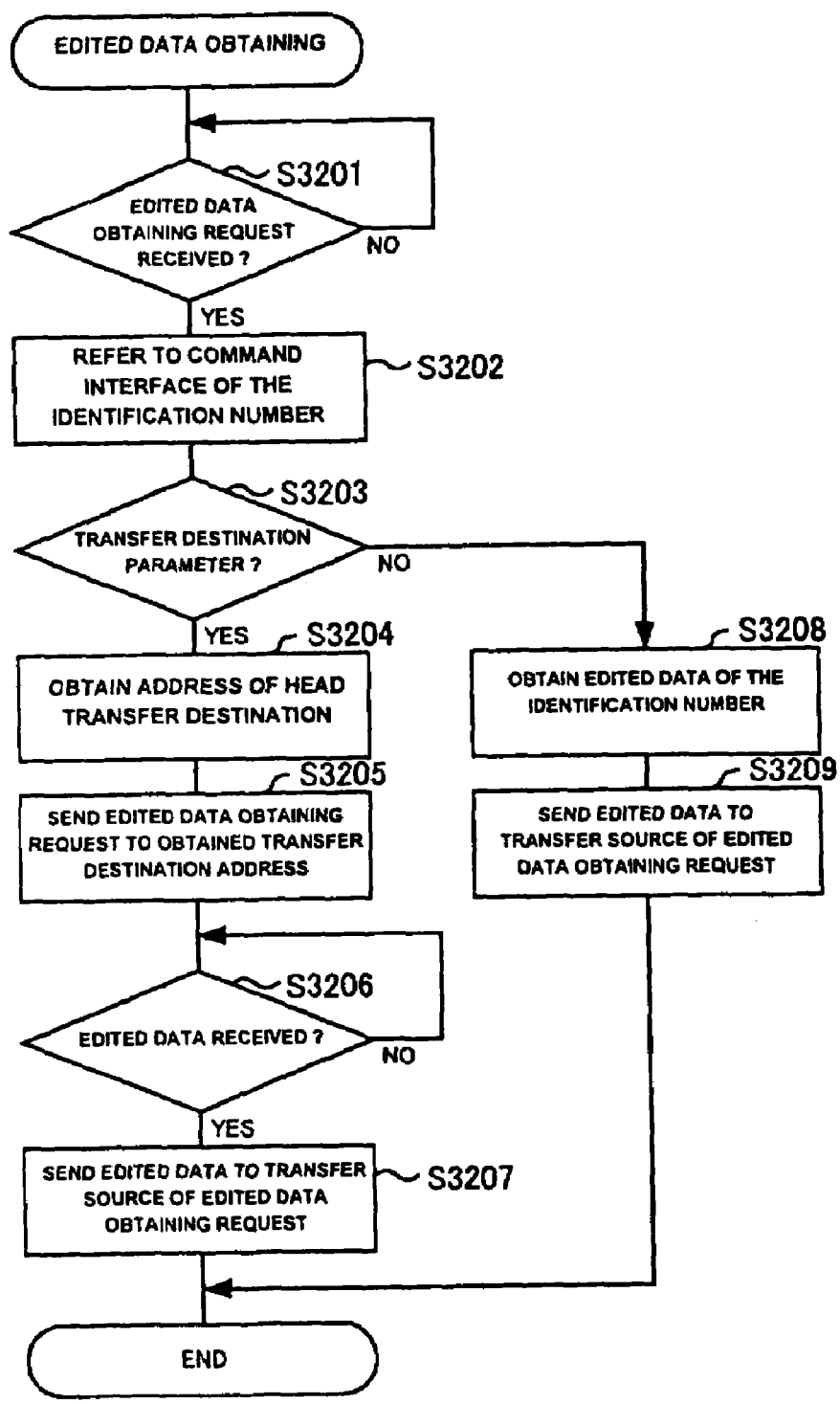
FIG. 32 shows a flowchart of processings in which a storage device obtains edited data of a command executed, using a command interface in accordance with an embodiment of the present invention.

FIG. 32 shows a flowchart of the processing to obtain edited data performed by the storage device (10, 20, 25).

In the process to obtain edited data, the storage device (10, 20, 25) waits until it receives a edited data obtaining request to obtain edited data (S3201). Upon receiving the request to obtain edited data, the storage device refers to the command interface 2601 at the identification number that is sent in the edited data obtaining request (S3202). The storage device (10, 20, 25) confirms if the command interface 2601 referred to contains a transfer destination parameter (S3203). If the transfer destination parameter exists, it is not the storage device (10, 20, 25) that executed the command, such that the storage device (10, 20, 25) obtains a transfer destination address at the head of the transfer destination parameter (S3204), and sends the edited data obtaining request to the obtained transfer destination address (S3205). The storage device (10, 20, 25) waits until it receives edited data (S3206), and, when it receives the edited data, the storage device sends the edited data received to the transmission source of the edited data obtaining request (S3207). When no transfer destination parameter exists, it is the storage device that executed the command, the storage device (10, 20, 25) obtains edited data of the identification number (S3208), and sends obtained edited data to the transmission source of the edited data obtaining request (S3209). By this, the edited data is sent to the information processing device 11 back along the path in which the command is transferred.

Figure 33:
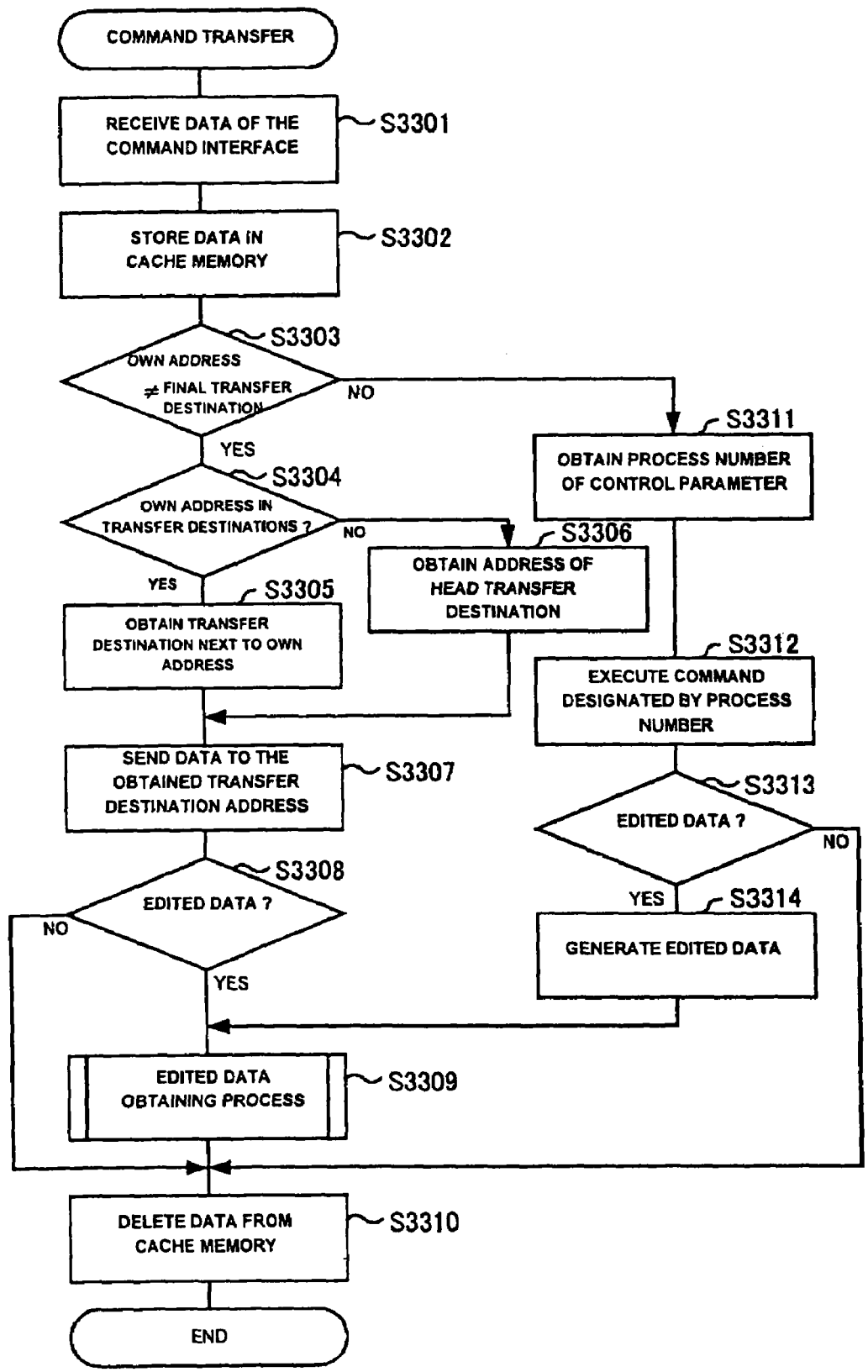
FIG. 33 shows a flowchart of processings in which a storage device transfers or executes a command without deleting a transfer destination address of a command interface in accordance with an embodiment of the present invention.
Figure 34:
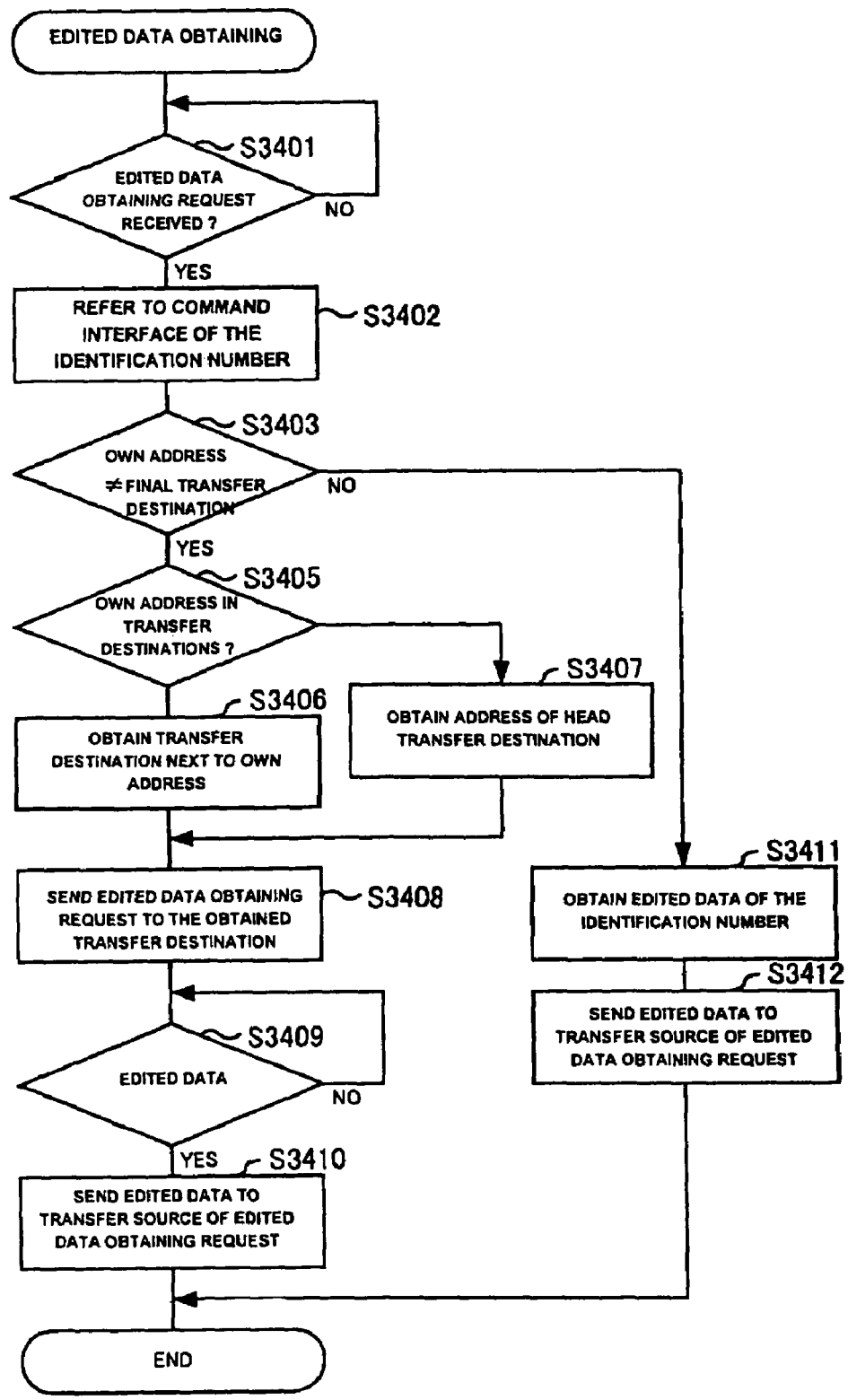
FIG. 34 shows a flowchart of processings in which a storage device obtains edited data of a command executed without deleting a transfer destination address of a command interface in accordance with an embodiment of the present invention.

In the processing indicated in FIG. 31, when the command interface 2601 is transferred, the transfer destination address at the head thereof is deleted. But, the data of the command interface 2601 can be sent to the transfer destination as is without deleting the transfer destination address. FIG. 33 and FIG. 34 show flowcharts of processings performed in this situation by the storage device (10, 20, 25).

FIG. 33 indicates processings performed by the storage device (10, 20, 25) as it receives the command interface 2601, and its basic process flow is generally the same as the process flow indicated in FIG. 31 (for example, S3301 is similar to S3101, S3302 is similar to S3102, S3307 is similar to S3106, S3308 is similar to S3107, S3310 is similar to S3109, S3313 is similar to S3112 and S3314 is similar to S3113). The process flow indicated in FIG. 33 differs from the process flow in FIG. 31 in that the storage device (10, 20, 25) that has received the data of the command interface 2601 needs to judge as to whether the storage device itself is in a transfer path or whether the storage device should execute a command.

More specifically, the storage device (10, 20, 25) confirms whether the last transfer destination address is the address of its own (S3303), and determines that the storage device (10, 20, 25) is in a transfer path if the last transfer destination address is not its own address, and determines that the storage device (10, 20, 25) should execute a command if the last transfer destination address is its own address. When the storage device (10, 20, 25) is in the transfer path, the storage device confirms whether the transfer destination address includes its own address (S3304); if its own address is included, the storage device obtains a transfer destination address next to the address of its own (S3305); and if its own address is not included, the storage device obtains the head transfer destination address (S3306). Then, the storage device (10, 20, 25) sends the data of the command interface 2601 to the obtained transfer destination address (S3307). When the storage device (10, 20, 25) is to execute a command, the storage device (10, 20, 25) obtains a process number of the control parameter (S3311), and executes a command designated by the process number (S3312). Other processings are basically the same as those of the processings indicated in FIG. 31 except an edited data obtaining process (S3309).

FIG. 34 shows a flowchart of the edited data obtaining process performed when the transfer destination address is not deleted. Some of the steps in FIG. 34 are similar to steps in FIG. 32 (for example, S3401 is similar to S3201, S3402 is similar to S3202, S3409 is similar to S3206, S3410 is similar to S3207, S3411 is similar to S3208 and S3412 is similar to S3209). The edited data obtaining process in FIG. 34 differs from the process indicated in FIG. 31 in that the storage device that has received an edited data obtaining request needs to judge whether the storage device (10, 20, 25) itself is in a transfer path or whether the storage device (10, 20, 25) itself has executed the command. The storage device (10, 20, 25) judges by the same method indicated in FIG. 33 (S3403); if the storage device (10, 20, 25) is in a transfer path, the storage device (10, 20, 25) sends the edited data obtaining request to the next transfer destination (S3405-S3408); and if the storage device (10, 20, 25) has executed the command, the storage device (10, 20, 25) obtains edited data of an identification number set in the edited data obtaining request (S3411). The other processings are the same as those indicated in FIG. 32.

[Determination of Shortest Transfer Path]

Next, a description will be made as to a process in which the storage device (10, 20, 25) determines the shortest transfer path and sends a command interface 2601 in the transfer path determined.

Figure 35:
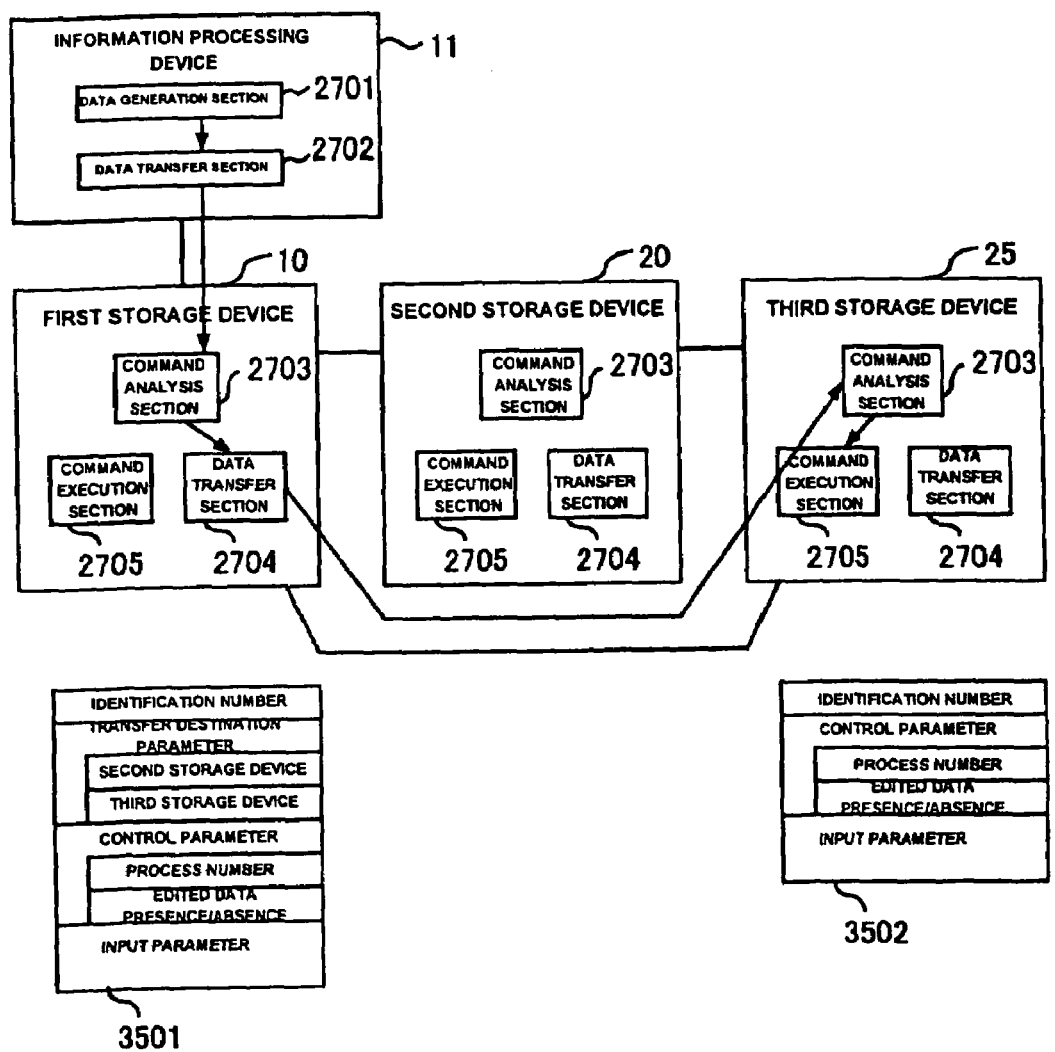
FIG. 35 schematically shows a diagram illustrating a storage device system in which the shortest transfer path is searched for sending a command interface in accordance with an embodiment of the present invention.
Figure 36:
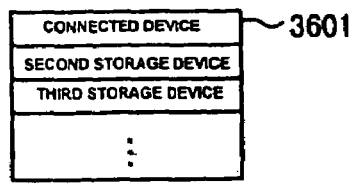
FIG. 36 shows an example of a connection information management table in accordance with an embodiment of the present invention.

FIG. 35 shows a flowchart of processings performed when the first storage device 10 receives data 3501 of a command interface from the information processing device 11. The shared memory 204 of the first storage device 10 stores a connection information management table 3601 indicated in FIG. 36. The connection information management table 3601 can be set by a system administrator through the management terminal 207. The connection information management table 3601 stores addresses of the storage devices 10 and 20 that are connected. For example, the connection information management table 3601 in FIG. 36 indicates that the first storage device 10 is connected to the second storage device 20 and the third storage device 25.

The first storage device 10, upon receiving the data 3501 of the command interface from the information processing device 11, refers to the connection information management table 3601, and obtains the address of the third storage device 25 which is set at the last of the transfer destination parameter. The first storage device 10 judges that data can be directly sent to the third storage device 25 because the address of the third storage device 25 is stored in the connection information management table 3601. The first storage device 10 generates data 3502 by deleting the transfer destination addresses of the third storage device 25 and the second storage device 20, and directly sends the data 3502 to the third storage device 25 without passing it through the second storage device 20.

Figure 37:
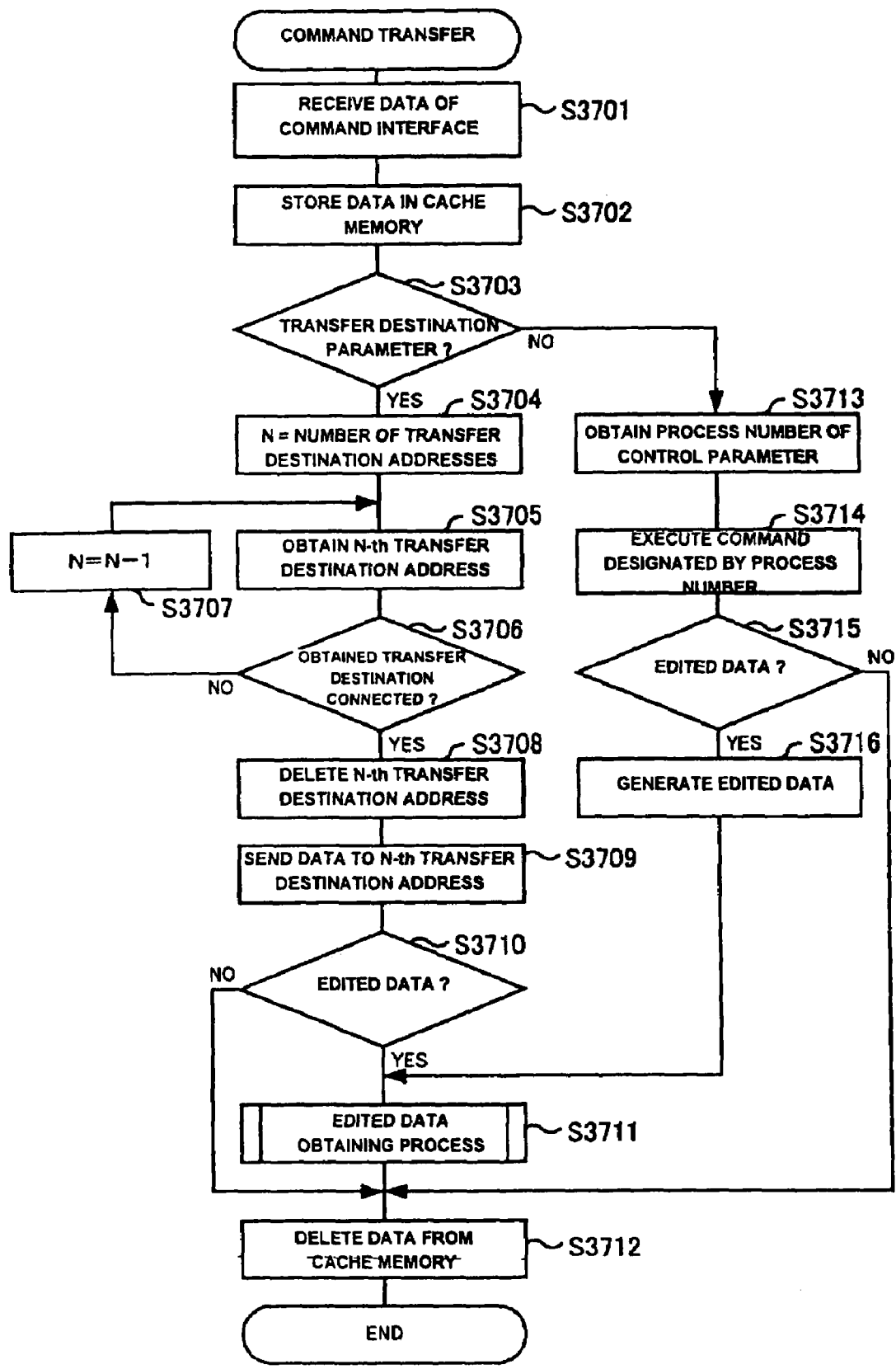
FIG. 37 shows a flowchart of processings in which the shortest transfer path among storage devices is searched for transferring a command interface or executing a command in accordance with an embodiment of the present invention.

FIG. 37 shows a flowchart of processings in which the storage device (which may be 10, 20 or 25) determines the shortest path and transfers data of a command interface, which differs from the processing indicated in FIG. 31 only in that the storage device (10, 20, 25) judges the shortest transfer path (S3701 is similar to S3101, S3702 is similar to S3102, S3703 is similar to S3103, S3710 is similar to S3107, S3712 is similar to S3109, S3713 is similar to S3110, S3714 is similar to S3111, S3715 is similar to S3112 and S3716 is similar to S3113).

The storage device (10, 20, 25) obtains the number of transfer destination addresses set in the transfer destination parameter, and sets the obtained number as a variable "N" (S3704). Then, the storage device (10, 20, 25) obtains the N-th transfer destination address (S3705), and confirms whether the obtained transfer destination address is stored in the connection information management table 3601 (S3706). When the obtained transfer destination address is not stored in the connection information management table 3601, the number N is reduced by 1 (S3707), and the storage device (10, 20, 25) repeats the processings to obtain the N-th transfer destination address and to confirm whether the obtained transfer destination address is stored in the connection information management table 3601 (S3705, S3706). As a result, the storage device (10, 20, 25) can obtain the shortest transfer path. Then, the storage device (10, 20, 25) deletes the transfer destination addresses before the N-th transfer destination address from the data of the command interface 2601 (S3708), and sends the data to the N-th transfer destination address (S3709). The other processings are the same as those indicated in FIG. 31. Also, the edited data obtaining process (S3711) is the same as the process in FIG. 32.

In this manner, the storage device (10, 20, 25) determines the shortest transfer path, and transfers a command along the shorted transfer path, such that the data transfer amount among the storage devices can be reduced, and the transfer time for transferring commands can be shorted.

[Execution of Command at Each of the Storage Devices]

Next, a description will be made as to a method in which the information processing device 11 sends commands to a plurality of storage devices 10, 20 and 30 with a single instruction.

Figure 38:
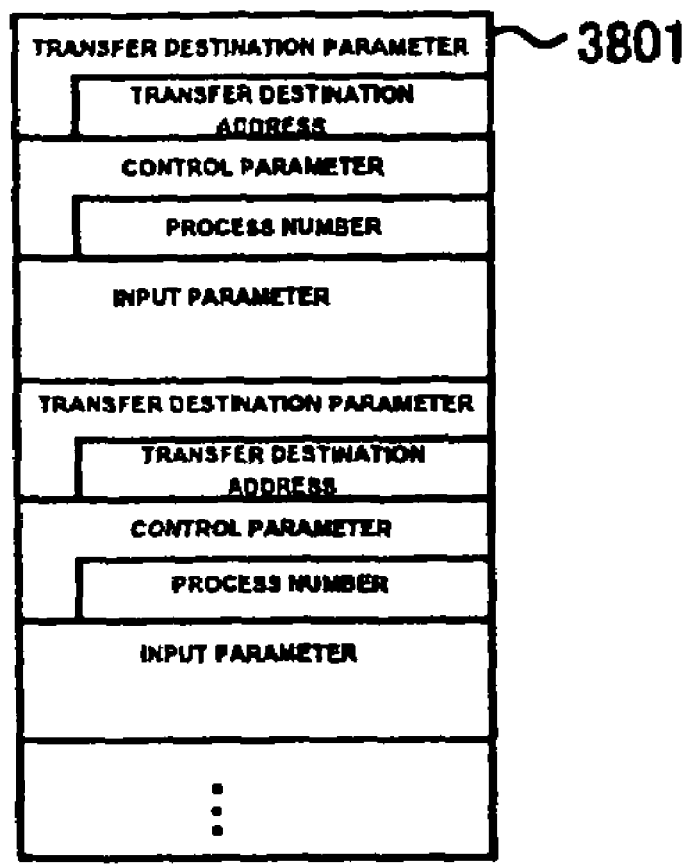
FIG. 38 shows an example of a command interface used when having a plurality of storage devices execute commands in accordance with an embodiment of the present invention.

FIG. 38 indicates a command interface 3801 for sending commands to a plurality of storage devices 10, 20 and 25. The command interface 3801 has a structure in which a plurality of command interfaces 2601 shown in FIG. 26 are connected.

Figure 39:
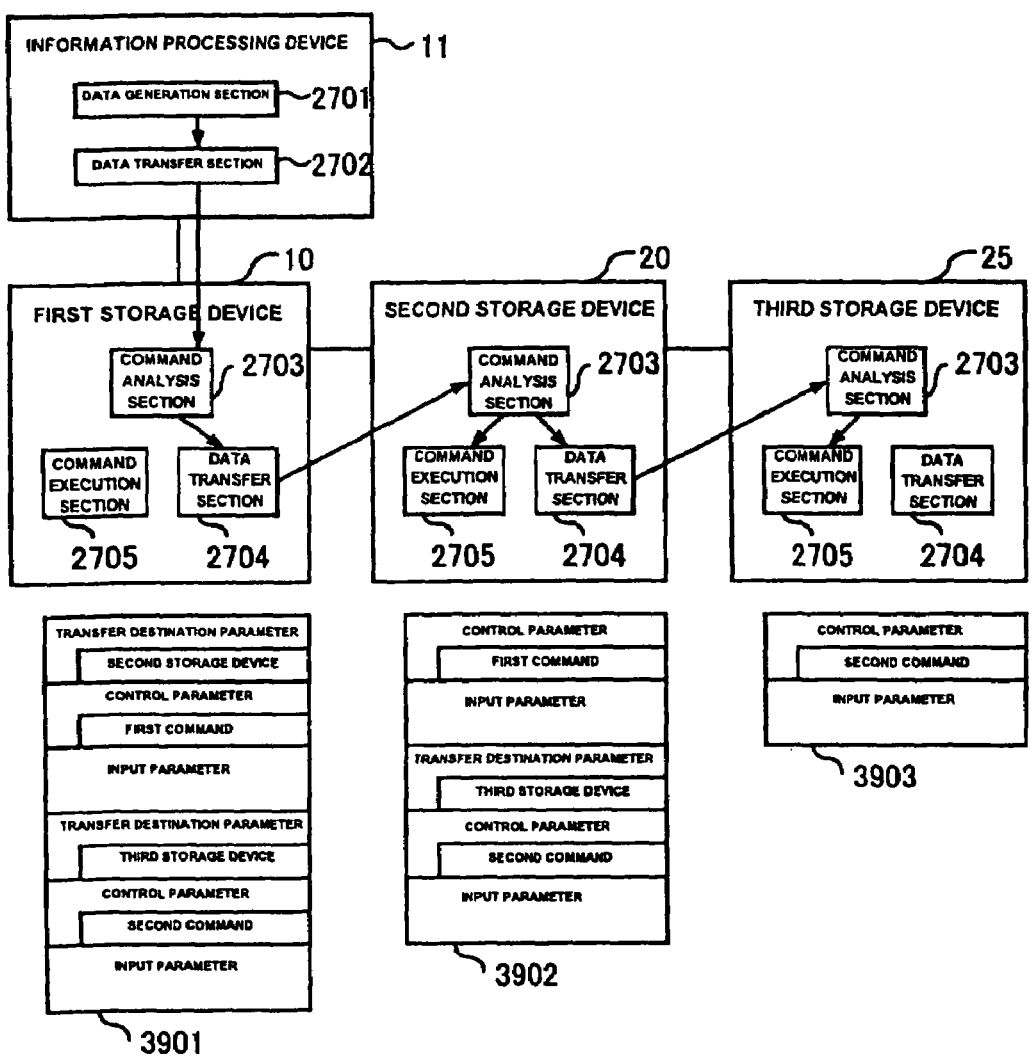
FIG. 39 schematically shows a diagram illustrating a storage device system in which an information processing device sends commands to a second storage device and a third storage device, using a command interface in accordance with an embodiment of the present invention.

FIG. 39 shows an example of processings in which the information processing device 11 sends a first command to the second storage device 20 and a second command to the third storage device 25. The information processing device 11 sets the second storage device 20 at the transfer destination address of the first transfer destination parameter, and the first command at the process number of the first control parameter. Then, the information processing device 11 sets the third storage device 25 at the transfer destination address of the second transfer destination parameter, and the second command at the process number of the second control parameter. The information processing device 11 sends data 3901 thus generated to the first storage device 10 that is located at the head of the transfer path.

The first storage device 10, upon receiving the data 3901, obtains the transfer destination address of the first transfer destination parameter, and sends data 3092 by deleting the head transfer destination parameter from the data 3901 to the second storage device 20. The second storage device 20, upon receiving the data 3902, executes the first command that is set in the first control parameter. Then the second storage device 20 deletes the head control parameter in the data 3902, and obtains the transfer destination address of the transfer destination parameter. The second storage device 20 sends to the third storage device 25 data 3903 by deleting the head transfer destination parameter from the data 3902. The third storage device 25, upon receiving the data 3903, executes the second command set in the head control parameter.

Figure 40:
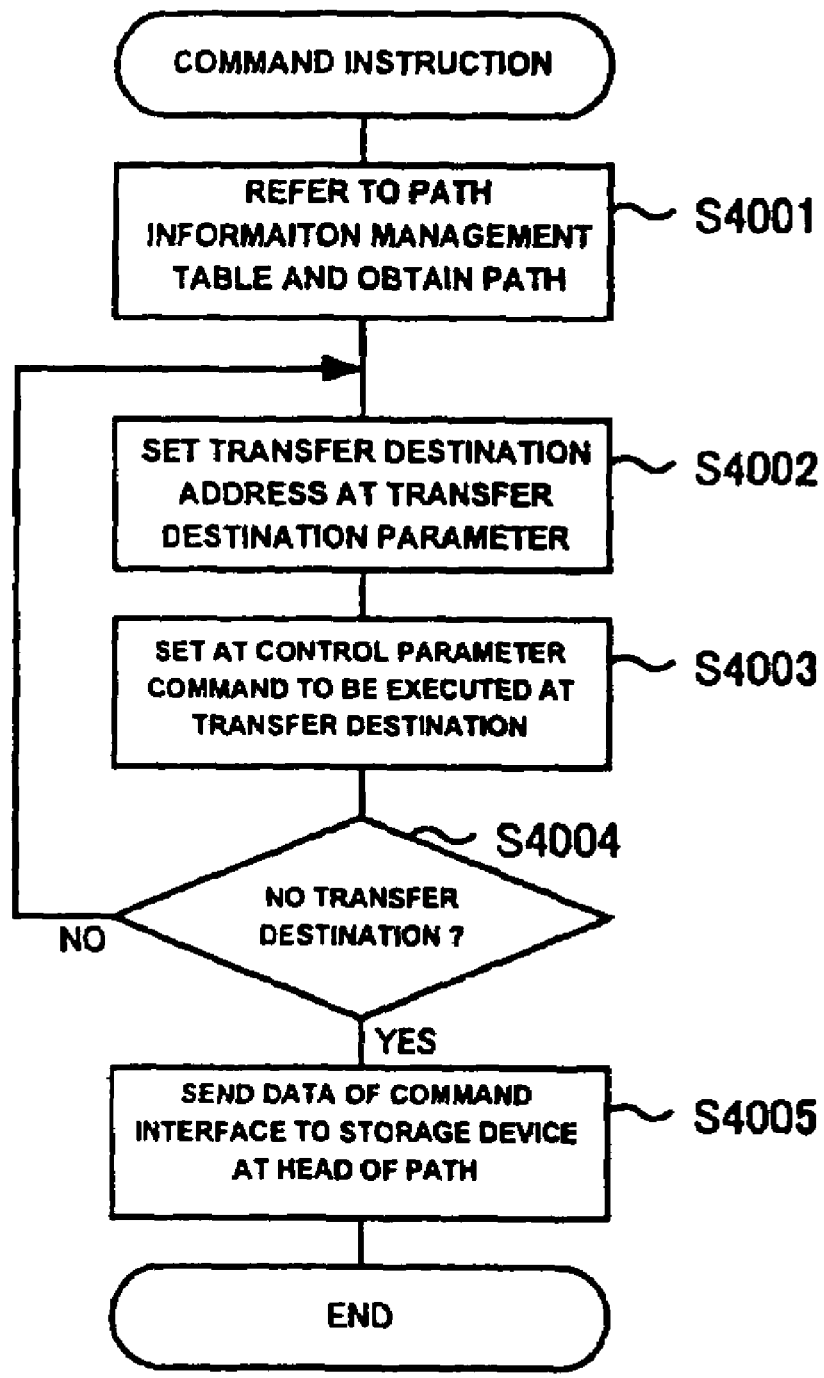
FIG. 40 shows a flowchart of processings in which an information processing device sends commands to a plurality of storage devices, using a command interface in accordance with an embodiment of the present invention.

FIG. 40 shows a flowchart of processings performed by the first information processing device 11 when sending commands to a plurality of storage devices 10, 20 and 25. The information processing device 11 refers to the path information management table 2501, and obtains paths to the storage devices 10, 20 and 25 to which the commands are sent (S4001). Then, the information processing device 11 repeats executions to set a transfer destination address in the transfer destination parameter (S4002) and to set a command in the control parameter (S4003) in the order from the head storage device 10 to the storage devices 20 and 25 in the path until there is no transfer destination remained (S4004). The information processing device 11 sends the data of the command interface 3801 thus generated to the head storage device 10 and the storage devices 20 and 25 in the transfer path (S4005).

Figure 41:
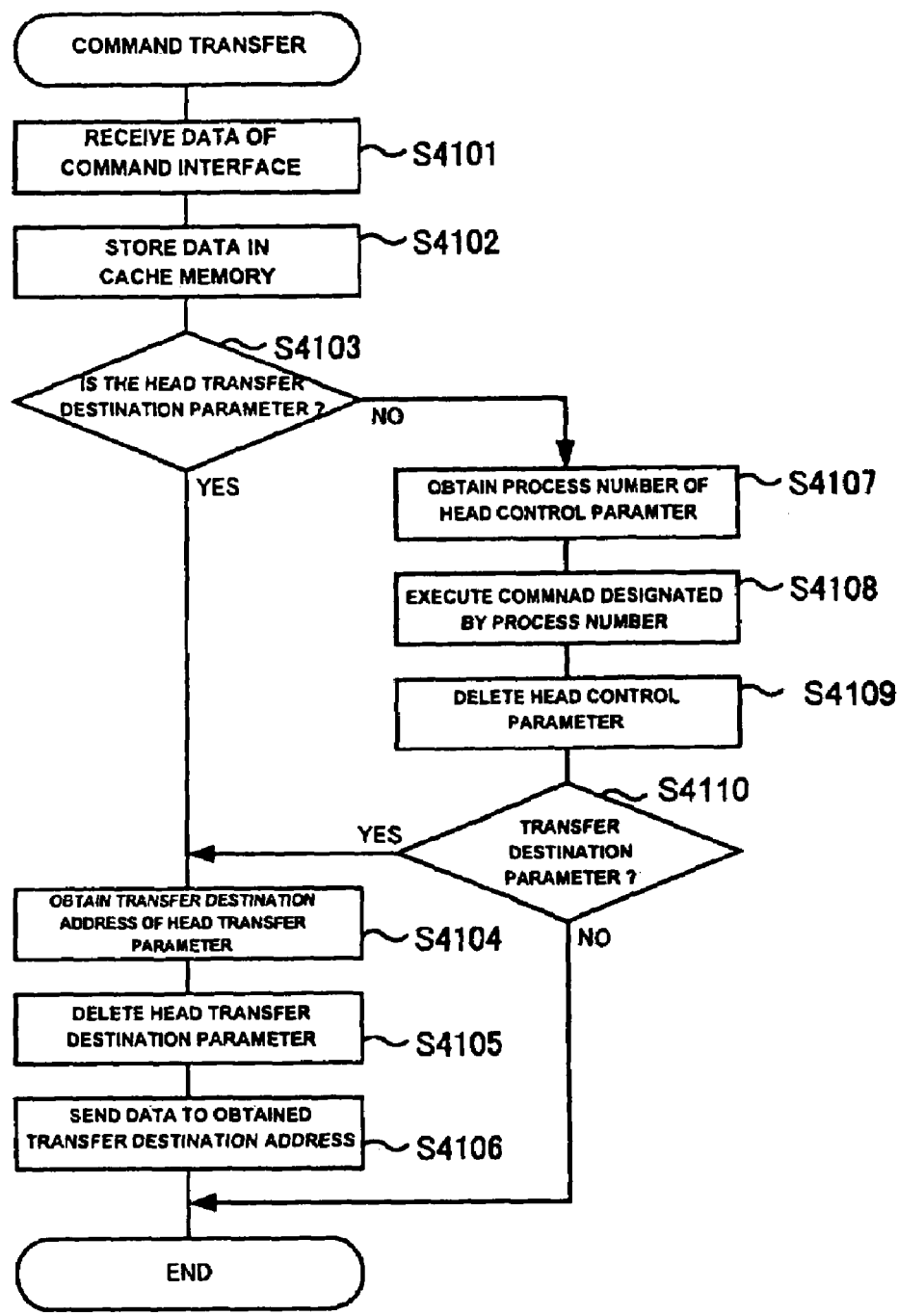
FIG. 41 shows a flowchart of processings performed by a storage device system in accordance with an embodiment of the present invention in which a command interface is transferred among a plurality of storage devices or commands are executed, using the command interface.

FIG. 41 shows a flowchart of processings performed at each of the storage devices 10, 20 and 25 when commands are sent to the plurality of storage devices 10, 20 and 25. The storage device (which may be 10, 20 or 25), upon receiving data of the command interface 3801 (S4101), stores the data in the cache memory (S4102). The storage device (10, 20, 25) confirms whether the head of the data is a transfer destination parameter (S4103). If the head of the data is a transfer destination parameter, the storage device (10, 20, 25) obtains a transfer destination address of the head transfer destination parameter (S4104), deletes the head transfer destination parameter from the data (S4105), and sends the data to the obtained transfer destination address (S4106). When the head of the data is not a transfer destination parameter, the storage device (10, 20, 25) obtains a process number of the head control parameter (S4107), and executes a command designated by the process number (S4108). The storage device (10, 20, 25) deletes the head control parameter (S4109), and confirms whether a further transfer destination parameter exists (S4110). When the further transfer destination parameter exists, the storage device (10, 20, 25) performs processings from obtaining a transfer destination address to sending data to the transfer destination address (S4104-S4106).

In this manner, by sending commands to a plurality of storage devices 10, 20 and 25, for example, in the case of forming asynchronous pairs among the storage devices, the information processing device 11 can perform controls, such as, simultaneously sending pair forming commands to the storage devices 10, 20 and 25 that form primary volumes and to the storage devices 10, 20 and 25 that form auxiliary volumes in asynchronous pairs. In other words, pairs can be readily formed without communicating among plural information processing devices.

In the above described embodiment, commands are transferred through designating transfer destination addresses. In the embodiment described above, the information processing device 11 sends commands to the storage devices 10, 20 and 25. However, each of the storage devices 10, 20 and 25 may be equipped with a data generation section 2701 and a data transmission section 2702.

By using the method of transferring commands through designating transfer destination addresses in a manner described above, commands can be executed by each of the storage devices 10, 20 and 25 which may not be connected to an information processing device, just as does the storage device system transfer commands through using virtual volumes and command devices. By this, data backup and pair operations can be conducted without communicating data among multiple information processing devices. Also, when commands are transferred through designating transfer destination addresses, dedicated logical volumes such as command devices do not need to be provided, and therefore data areas to be allocated to users would not be reduced. Also, in the case of command devices, there is a possibility that the performance of the storage devices 10, 20 and 25 may lower because data input/output requests may concentrate on specified logical volumes. In contrast, when transferring commands through designating transfer destination addresses, cache memories are used, such that a reduction in the performance of the storage devices 10, 20 and 25 can be prevented.

While the description above refers to particular embodiments of the present invention, it will be understood that these embodiments are presented for ready understanding of the present invention and many modifications may be made without departing from the spirit thereof. The accompanying claims are intended to cover such modifications as would fall within the true scope and spirit of the present invention. For example, in the present embodiments, commands that are transferred are commands relating to pairs of logical volumes. However, commands to be transferred are not limited to commands relating to pairs, but may be any commands that are executable by the storage devices 10, 20 and 25.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A storage system having at least three storage devices coupled in cascading fashion, the storage system comprising:
a first storage device of said at least three storage devices being coupled to a first information processing device and having a first controller and a plurality of first disk drives, a first portion of said first disk drives being related to a first logical volume and a second portion of said first disk drives being related to a second logical volume;

said first controller having a first information indicating that said first logical volume functions as a primary logical volume and a second information indicating that said second logical volume functions as a logical volume being used to transfer data;

said first controller receiving data, which are sent from said first information processing device and are targeted to said first logical volume, and storing data corresponding to said data sent from said first information processing device in said first portion of said first disk drives and storing data corresponding to said data sent from said first information processing device in said second portion of said first disk drives and transferring data corresponding to said data stored in said second portion of said first disk drives to a second storage device of said at least three storage devices;

said second storage device of said at least three storage devices being coupled to a second information processing device and said first storage device and having a second controller and a plurality of second disk drives, a third portion of said second disk drives being related to a third logical volume and a fourth portion of said second disk drives being related to a fourth logical volume;

said second controller having a third information indicating that said third logical volume functions as a logical volume being used to receive data and a fourth information indicating that said fourth logical volume functions as a secondary logical volume forming a pair relationship with said primary logical volume; and said second controller receiving said data transferred from said first controller and storing data corresponding to said data transferred from said first controller in said third portion of said second storage device and storing data corresponding to said data stored in said third portion of said second disk drives in said fourth portion of said second storage device;

wherein said first storage device and said second storage device change said first information, said second information, said third information and said fourth information based on at least one command sent from said second information processing device so that said second information processing device sends data targeted to said fourth logical volume, if said first information processing device has a failure, wherein said changed first information indicates that said first logical volume now functions as said secondary logical volume, wherein said changed second information indicates that said second logical volume now functions as said logical volume being used to receive data, wherein said changed third information indicates that said third logical volume now functions as said logical volume being used to transfer data, and wherein said changed fourth information indicates that said fourth logical volume now functions as said primary logical volume.

2. A storage system according to claim 1, wherein:
said first and/or second controller have a pair management information of relationship with said first logical volume and said fourth logical volume.

3. A storage system according to claim 1, wherein:
said first and/or second controller have a pair management information, which indicates whether it is under copying data from said first logical volume to said fourth logical volume or not.

4. A storage system according to claim 1, wherein:
said first and/or second controller have a pair management information of whether it is under restoring data from said first logical volume to said fourth logical volume or not.

5. A storage system according to claim 1, wherein:
said first controller has a pair management information of relationship between said first logical volume and said second logical volume.

6. A storage system according to claim 1, wherein:
said first and/or second controller have a pair management information, which indicates whether it is under copying data from said fourth logical volume to said first logical volume or not.

7. A storage system according to claim 1, wherein:
said first controller has a pair management information of whether it is under copying data corresponding to said first logical volume to said second logical volume or not.

8. A storage system according to claim 1, wherein:
said second information processing device sends said command, which are used to change a pair management information including said first information, said second information, said third information and said fourth information.

9. A storage system according to claim 1, wherein:
said first controller manages a plurality of regions in said second portion of said first disk drives stored data, which will be transferred from said second logical volume to said third logical volume, before changing said first information, said second information, said third information and said fourth information.

10. A storage system according to claim 1, wherein:
said second controller manages a plurality of regions in said third portion of said second disk drives stored data, which will be stored from said third logical volume to said fourth logical volume, by at least one pointer before changing said first information, said second information, said third information and said fourth information.

11. A storage system according to claim 1, wherein:
said first controller manages a plurality of regions in said second portion of said first disk drives stored data, which will be transferred from said second logical volume to said third logical volume, by at least one pointer before changing said first information, said second information, said third information and said fourth information, and said regions stored data include a plurality of regions in which said data corresponding to said data sent from said first information processing device are under storing by said first controller.

12. A storage system according to claim 1, wherein:
said second controller manages a plurality of regions in said third portion of said second disk drives in which said data sent from said first controller are under storing by said second controller, before changing said first information, said second information, said third information and said fourth information.

13. A storage system according to claim 1, wherein:
said second controller transfers said command sent from said second information processing device to said first storage device based on contents of said first command.

14. A storage system according to claim 1, wherein:
said second controller transfers said command sent from said second information processing device to said first storage device, if an address of said command sent from said second information processing device is a certain address of a fifth logical volume.

15. A storage system according to claim 1, wherein:
said command sent from said second information processing device has an information, which is used to identify said third logical volume from a plurality of logical volumes.

16. A storage system according to claim 1, wherein:
each of said logical volumes has a logical unit number, which is used to identify a logical volume from a plurality of logical volumes; and
said command sent from said second information processing device has an information of a plurality of said logical unit number corresponding to said third and fourth logical volumes.

17. A storage system according to claim 1, wherein:
said second controller executes contents of said command sent from said second information processing device, if said command sent from said second information processing device does not have an information of said first storage device.

18. A storage system according to claim 1, wherein:
said second controller manages a plurality of regions in said third portion of said second disk drives in which data stored in said third portion of said second disk drives are under storing from said third portion of said second disk drives in said fourth portion of said second disk drives by said second controller.

19. A storage system according to claim 1, wherein:
said second controller, after changing said third information and said fourth information, receives data sent from said second information processing device to said fourth logical volume and stores data corresponding to said data sent from said second information processing device in said fourth portion of said second disk drives and stores data corresponding to said data sent from said second information processing device in said third portion of said second disk drives and transfers data corresponding to said data stored in said third portion of said second disk drives to said first storage device.

20. A storage system according to claim 1, wherein:
said second controller, after changing said third information and said fourth information, receives data sent from said second information processing device to said fourth logical volume and stores data corresponding to said data sent from said second information processing device in said fourth portion of said second disk drives and stores data corresponding to said data sent from said second information processing device in said third portion of said second disk drives and transfers data corresponding to said data stored in said third portion of said second disk drives to said first storage device, and
said first controller, after changing said first information and said second information, receives said data transferred from said second controller and stores data corresponding to said data transferred from said second controller in said second portion of said first storage device and stores data corresponding to said data stored in said second portion of said first disk drives in said first portion of said first storage device.

21. A storage system according to claim 1, wherein:
said data stored in said second logical volume is appended an update information, which is used to maintain a consistency when said data stored in said third portion of said second disk drives are stored in said fourth portion of said second disk drives.

22. A storage system according to claim 1, wherein:
said second logical volume and said third logical volume each function as a journal volume in which a journal data stored.

23. A storage system having at least three storage devices coupled in serial fashion, comprising:
a first storage device of said at least three storage devices being coupled to a first information processing device and having a plurality of first disk drives, a first portion of said first disk drives being related to a first logical volume and a second portion of said first disk drives being related to a second logical volume;
a first controller having a first information indicating that said first logical volume functions as a primary logical volume and a second information indicating that said second logical volume functions as a logical volume being used to transfer data;
a second storage device of said at least three storage devices being coupled to a second information processing device and said first storage device and having a plurality of second disk drives, a third portion of said second disk drives being related to a third logical volume and a fourth portion of said second disk drives being related to a fourth logical volume; and
a second controller having a third information indicating that said third logical volume functions as a logical volume being used to receive data and a fourth information indicating that said fourth logical volume functions as a secondary logical volume corresponding to said primary volume,
wherein said first controller receives data sent from said first information processing device to said first logical volume and storing said data sent from said first information processing device in said first logical volume and storing data corresponding to said data sent from said first information processing device in said second logical volume and transferring said data stored in said second logical volume to a second storage device,
wherein said second controller receiving said data transferred from said first controller and storing said data transferred from said first controller in said third logical volume and storing data corresponding to said data stored in said third logical volume in said fourth logical volume,
wherein said first storage device and said second storage device change said first information, said second information, said third information and said fourth information based on at least one command sent from said second information processing device, if said first information processing device has a failure,
wherein said changed first information indicates that said first logical volume now functions as said secondary logical volume,
wherein said changed second information indicates that said second logical volume now functions as said logical volume being used to receive data,
wherein said changed third information indicates that said third logical volume now functions as said logical volume being used to transfer data,
wherein said changed fourth information indicates that said fourth logical volume now functions as said primary logical volume,
wherein said second controller, after changing said third information and said fourth information, receives data sent from said second information processing device to said fourth logical volume and stores said data sent from said second information processing device in said fourth logical volume and stores data corresponding to said data sent from said second information processing device in said third logical volume and transfers said data stored in said third logical volume to said first storage device, and wherein said first controller, after changing said first information and said second information, receives said data transferred from said second controller and stores said data transferred from said second controller in said second logical volume and stores data corresponding to said data stored in said second logical volume in said first logical volume.

24. A storage system having at least three storage devices coupled in cascading fashion, the storage system comprising:

a first storage device of said at least three storage devices being coupled to a first information processing device and having a first controller and a plurality of first disk drives, a first portion of said first disk drives being related to a first logical volume and a second portion of said first disk drives being related to a second logical volume;

said first controller having a first information indicating that said second logical volume functions as a logical volume being used to transfer data;

said first controller receiving data sent from said first information processing device to said first logical volume and storing said data sent from said first information processing device in said first logical volume and storing data corresponding to said data sent from said first information processing device in said second logical volume and transferring said data stored in said second logical volume to a second storage device;

said second storage device of said at least three storage devices being coupled to a second information processing device and said first storage device and having a second controller and a plurality of second disk drives, a third portion of said second disk drives being related to a third logical volume and a fourth portion of said second disk drives being related to a fourth logical volume;

said second controller having a second information indicating that said third logical volume functions as a logical volume being used to receive data; and said second controller receiving said data transferred from said first controller and storing said data transferred from said first controller in said third logical volume and storing data corresponding to said data stored in said third logical volume in said fourth logical volume;

wherein said first storage device and said second storage device change said first information and said second information based on at least one command sent from said second information processing device so that said second information processing device sends data targeted to said fourth logical volume, if said first information processing device has a failure, wherein said changed first information indicates that said second logical volume functions as said logical volume being used to receive data, and wherein said changed second information indicates that said third logical volume functions as said logical volume being used to transfer data.

25. A storage system according to claim 24, wherein:

said first controller manages a plurality of regions in said second portion of said first disk drives stored data, which will be transferred from said second logical volume to said third logical volume, by using at least one pointer before changing said first information and said second information.

26. A storage system according to claim 24, wherein:

said second controller manages a plurality of regions in said third portion of said second disk drives stored data, which will be stored from said third logical volume to said fourth logical volume, before changing said first information and said second information.

27. A storage system according to claim 24, wherein:

said first controller manages a plurality of regions in said second portion of said first disk drives stored data, which will be transferred from said second logical volume to said third logical volume, before changing said first information and said second information, and said regions in said second portion of said first disk drives include a plurality of regions in which said data sent from said first information processing device are under storing by said first controller.

28. A storage system according to claim 24, wherein:

said second controller manages a plurality of regions in said third portion of said second disk drives in which said data sent from said first controller are under storing by said second controller, by at least one pointer before changing said first information and said second information.

29. A storage system according to claim 24, wherein:

said data stored in said second logical volume is appended an update information, which is used to maintain a consistency when said data stored in said third logical volume are stored in said fourth logical volume.

30. A storage system according to claim 24, wherein:

said second logical volume and said third logical volume each function as a journal volume in which a journal data stored.

31. A storage system according to claim 24, wherein:

said command sent from said second information processing device is targeted to said second storage device.

32. A storage system having at least three storage devices coupled in serial fashion, the storage system comprising:

a first storage device of said at least three storage devices being coupled to a first information processing device and having a first controller and a plurality of first disk drives, a first portion of said first disk drives being related to a first logical volume and a second portion of said first disk drives being related to a second logical volume; and a second storage device of said at least three storage devices being coupled to a second information processing device and said first storage device and having a second controller and a plurality of second disk drives, a third portion of said second disk drives being related to a third logical volume and a fourth portion of said second disk drives being related to a fourth logical volume;

wherein said storage system has a first status including that said first logical volume functions as a primary logical volume being stored data sent from a primary information processing device, if said first information processing device functions as said primary information processing device sending data, said second logical volume functions as a transferring logical volume in which data corresponds to an updated data stored in said primary logical volume are stored, said third logical volume functions as a receiving logical volume in which data corresponds to said data stored in said transferring logical volume are stored, and said fourth logical volume functions as a secondary logical volume, which forms a pair relationship of a remote copy process with said primary logical volume and stores data corresponding to said data stored in said receiving logical volume, wherein said storage system has a second status including that said fourth logical volume functions as said primary logical volume, if said second information processing device functions as said primary information processing device, said third logical volume functions as said transferring logical volume, said second logical volume functions as said receiving logical volume, and said first logical volume functions as said secondary logical volume, and wherein said storage system is changed from said first status to said second status based on one or more commands sent from said second information processing device.

33. A storage system according to claim 32, wherein:
said first controller manages a plurality of regions in said second portion of said first disk drives stored data, which will be transferred from said second logical volume to said third logical volume, by using at least one pointer during said first status of said storage system.

34. A storage system according to claim 32, wherein:
said second controller manages a plurality of regions in said third portion of said second disk drives stored data, which will be stored from said third logical volume to said fourth logical volume, during said first status of said storage system.

35. A storage system according to claim 32, wherein:
said first controller manages a plurality of regions in said second portion of said first disk drives stored data, which will be transferred from said second logical volume to said third logical volume, during said first status of said storage system, and said regions in said second portion of said first disk drives include a plurality of regions in which said data sent from said first information processing device are under storing by said first controller.

36. A storage system according to claim 32, wherein:
said second controller manages a plurality of regions in said third portion of said second disk drives in which said data sent from said first controller are under storing by said second controller, by at least one pointer during said first status of said storage system.

37. A storage system according to claim 32, wherein:
said data stored in said second logical volume is appended an update information, which is used to maintain a consistency when said data stored in said third logical volume are stored in said fourth logical volume.

38. A storage system according to claim 32, wherein:
said second logical volume and said third logical volume each function as a journal volume in which a journal data stored.

39. A storage system according to claim 32, wherein:
said commands sent from said second information processing device is targeted to said second storage device.

40. A storage system having at least three storage devices coupled in cascading fashion, the storage system comprising:
a first storage device of said at least three storage devices being coupled to a first information processing device and having a first controller and a plurality of first disk drives, a first portion of said first disk drives being related to a first logical volume and a second portion of said first disk drives being related to a second logical volume; and a second storage device of said at least three storage devices being coupled to a second information processing device and said first storage device and having a second controller and a plurality of second disk drives, a third portion of said second disk drives being related to a third logical volume and a fourth portion of said second disk drives being related to a fourth logical volume;

wherein said storage system has a first status including that said first logical volume functions as a primary logical volume being stored data sent from a primary information processing device, if said first information processing device functions as said primary information processing device sending data, said second logical volume functions as a transferring logical volume being stored data, which corresponds to an updated data stored in said primary logical volume and is transferred to said second storage device, said third logical volume functions as a receiving logical volume being stored data, which is received from said first storage device, and said fourth logical volume functions as a secondary logical volume, which forms a pair relationship with said primary logical volume and is stored data from said receiving logical volume, wherein said storage system has a second status including that said fourth logical volume functions as said primary logical volume, if said second information processing device functions as said primary information processing device, said third logical volume functions as said transferring logical volume, said second logical volume functions as said receiving logical volume, and said first logical volume functions as said secondary logical volume, and wherein said storage system is changed from said first status to said second status if said first information processing device has a failure.

41. A storage system having at least three storage devices connected in serial fashion, comprising:
a first storage device of said at least three storage devices being coupled to a first information processing device and having a first controller and a plurality of first disk drives, a first portion of said first disk drives being related to a first logical volume and a second portion of said first disk drives being related to a second logical volume; and a second storage device of said at least three storage devices being coupled to said first storage device and having a second controller and a plurality of second disk drives, a third portion of said second disk drives being related to a third logical volume and a fourth portion of said second disk drives being related to a fourth logical volume;

wherein said storage system performs a first asynchronous remote copy process according to a first status in which said first logical volume functions as a primary logical volume which stores data sent from said first information processing device, said second logical volume functions as a transferring logical volume which stores data, corresponding to updated data stored in said primary logical volume and to be transferred to said second storage device, said third logical volume functions as a data storing logical volume in which stores data corresponding to at least one data of an auxiliary logical volume, and said fourth logical volume functions as said auxiliary logical volume, which forms a pair relationship with said primary logical volume and stores data corresponding to data previously stored in said primary logical volume, wherein said storage system performs a second asynchronous remote copy process according to a second status in which said fourth logical volume functions as said primary logical volume, said third logical volume functions as said transferring logical volume which stores data which is to be transferred to said first storage device, said second logical volume functions as said data storing logical volume, and said first logical volume functions as said auxiliary logical volume, and wherein said storage system is changed from said first status to said second status based on one or more commands.

42. A storage system according to claim 41, wherein:

said first controller manages a plurality of regions in said second logical volume which store data, which will be transferred from said second logical volume to said second storage device, by using at least one pointer during said first status of said storage system.

43. A storage system according to claim 41, wherein:

said second controller manages a plurality of regions in said third logical volume during said first status of said storage system.

44. A storage system according to claim 41, wherein:

said first controller manages a plurality of regions in said second logical volume which store data, which will be transferred from said second logical volume to said second storage device, during said first status of said storage system, and said regions in said second logical volume include a plurality of regions in which said data sent from said first information processing device are being stored by said first controller.

45. A storage system according to claim 41, wherein:

said second controller manages a plurality of regions in said third logical volume in which said data corresponding to said at least one data of said auxiliary logical volume are stored, during said first status of said storage system.

46. A storage system according to claim 41, wherein:

said data stored in said second logical volume is appended an update information, which is used to maintain a consistency when said data previously stored in said first logical volume are stored in said fourth logical volume.

47. A storage system according to claim 41, wherein:

said second logical volume function as a journal volume in which a journal data is stored.

48. A storage system according to claim 41, wherein:

said one or more commands are targeted to said second storage device.

49. A storage system according to claim 41, wherein:

said transferring logical volume repeatedly stores data corresponding to each updated data stored in said primary logical volume and one or more data stored in said transferring logical volume are repeatedly transferred to said second storage device during said first asynchronous remote copy process.

50. A storage system having at least three storage devices coupled in cascading fashion, comprising:

a first storage device of said at least three storage devices being coupled to a first information processing device and having a first controller and a plurality of first disk drives, a first portion of said first disk drives being related to a first logical volume and a second portion of said first disk drives being related to a second logical volume; and a second storage device of said at least three storage devices being coupled to a second information processing device and said first storage device and having a second controller and a plurality of second disk drives, a third portion of said second disk drives being related to a third logical volume and a fourth portion of said second disk drives being related to a fourth logical volume;

wherein said storage system performs a first asynchronous remote copy process according to a first status in which said first logical volume functions as a primary logical volume which stores data sent from said first information processing device, said second logical volume functions as a transferring logical volume which stores data, corresponding to updated data stored in said primary logical volume and to be transferred to said second storage device, said third logical volume functions as a data storing logical volume which stores data corresponding to at least one data of an auxiliary logical volume, and said fourth logical volume functions as said auxiliary logical volume, which forms a pair relationship with said primary logical volume and stores data corresponding to data previously stored in said primary logical volume, wherein said storage system performs a second asynchronous remote copy process according to a second status in which said fourth logical volume functions as a substitute for said primary logical volume which stores data sent from said second information processing device, said third logical volume functions as a substitute for said transferring logical volume which stores data which is to be transferred to said first storage device, said second logical volume functions as said data storing logical volume, and said first logical volume functions as said auxiliary logical volume, and wherein said storage system is changed from said first status to said second status if said first information processing device has a failure and/or if at least one of said first storage device or said second storage device receives at least one command.

51. A storage system according to claim 50, wherein:

said first controller manages a plurality of regions in said second logical volume which store data, which will be transferred from said second logical volume to said second storage device, by using at least one pointer during said first status of said storage system.

52. A storage system according to claim 50, wherein:

said second controller manages a plurality of regions in said third logical volume during said first status of said storage system.

53. A storage system according to claim 50, wherein:

said first controller manages a plurality of regions in said second logical volume which store data, which will be transferred from said second logical volume to said second storage device, during said first status of said storage system, and said regions in said second logical volume include a plurality of regions in which said data sent from said first information processing device are being stored by said first controller.

54. A storage system according to claim 50, wherein:
said second controller manages a plurality of regions in said third logical volume in which said data corresponding to said at least one data of said auxiliary logical volume are stored, during said first status of said storage system.

55. A storage system according to claim 50, wherein:
said transferring logical volume repeatedly stores data corresponding to each updated data stored in said primary logical volume and one or more data stored in said transferring logical volume are repeatedly transferred to said second storage device during said first asynchronous remote copy process.

56. A storage system according to claim 50, wherein:
said storage system is changed from said first status to said second status if at least one of said first storage device or said second storage device receives said at least one command, said at least one command being sent from said second information processing device.

57. A storage system according to claim 56, wherein:
said second storage device, based on said at least one command, changes said fourth logical volume functioning as said auxiliary logical volume to said fourth logical volume functioning as said primary logical volume and changes said third logical volume functioning as said data storing logical volume to said third logical volume functioning as said transferring logical volume, and
said first storage device, based on a communication with said second storage device, changes said first logical volume functioning as said primary logical volume to said first logical volume functioning as said auxiliary logical volume and changes said second logical volume functioning as said transferring logical volume to said second logical volume functioning as said data storing logical volume, said communication being processed based on said at least one command.

58. A storage system having at least three storage devices coupled in serial fashion, comprising:
a first storage device of said at least three storage devices being coupled to a first information processing device and having a first controller and a plurality of first disk drives, a first portion of said first disk drives being related to a first logical area and a second portion of said first disk drives being related to a second logical area; and
a second storage device of said at least three storage devices being coupled to said first storage device and having a second controller and a plurality of second disk drives, a third portion of said second disk drives being related to a third logical area and a fourth portion of said second disk drives being related to a fourth logical area;
wherein said storage system performs a first asynchronous remote copy process according to a first status in which
said first logical area functions as a primary logical volume which stores data sent from said first information processing device,
at least one portion of said second logical area functions as a transferring logical area which stores data, corresponding to updated data stored in said primary logical volume and to be transferred to said second storage device,
at least one portion of said third logical area functions as a data storing logical area which stores data corresponding to at least one data of an auxiliary logical volume, and
said fourth logical area functions as said auxiliary logical volume, which forms a pair relationship with said primary logical volume and which stores data corresponding to data already stored in said primary logical volume,
wherein said storage system performs a second asynchronous remote copy process according to a second status in which
said fourth logical area functions as said primary logical volume,
at least one portion of said third logical area functions as said transferring logical area which stores data which is to be transferred to said first storage device,
at least one portion of said second logical area functions as said data storing logical area, and
said first logical area functions as said auxiliary logical volume, and
wherein said storage system is changed from said first status to said second status if at least one of said first storage device or said second storage device receives at least one command.

59. A storage system according to claim 58, wherein:
said first controller manages a plurality of regions in said second logical area which store data, which will be transferred from said at least one portion of said second logical area to said second storage device, by using at least one pointer during said first status of said storage system.

60. A storage system according to claim 58, wherein:
said second controller manages a plurality of regions in said third logical area during said first status of said storage system.

61. A storage system according to claim 58, wherein:
said first controller manages a plurality of regions in said second logical area which store data, which will be transferred from said at least one portion of said second logical area to said second storage device, during said first status of said storage system, and
said regions in said second logical area include a plurality of regions in which said data sent from said first information processing device are being stored by said first controller.

62. A storage system according to claim 58, wherein:
said second controller manages a plurality of regions in said third logical area in which said data corresponding to said at least one data of said auxiliary logical volume are stored, during said first status of said storage system.

63. A storage system according to claim 58, wherein:
said transferring logical area repeatedly stores data corresponding to each updated data stored in said primary logical volume and one or more data stored in said transferring logical area are repeatedly transferred to said second storage device during said first asynchronous remote copy process.

64. A storage system having at least three storage devices coupled in cascading fashion, comprising:
a first storage device of said at least three storage devices being coupled to a first information processing device and having a first controller and a plurality of first disk drives, a first portion of said first disk drives being related to a first logical area and a second portion of said first disk drives being related to a second logical area; and a second storage device of said at least three storage devices being coupled to a second information processing device and said first storage device and having a second controller and a plurality of second disk drives, a third portion of said second disk drives being related to a third logical area and a fourth portion of said second disk drives being related to a fourth logical area;

wherein said storage system performs a first asynchronous remote copy process according to a first status in which said first logical area functions as a primary logical volume which stores data sent from said first information processing device, at least one portion of said second logical area functions as a transferring logical area which stores data, corresponding to an updated data stored in said primary logical volume and to be transferred to said second storage device, at least one portion of said third logical area functions as a data storing logical area which stores data corresponding to at least one data of an auxiliary logical volume, and said fourth logical area functions as said auxiliary logical volume, which forms a pair relationship with said primary logical volume and which stores data corresponding to data previously stored in said primary logical volume, wherein said storage system performs a second asynchronous remote copy process according to a second status in which said fourth logical area functions as a substitute for said primary logical volume which stores data sent from said second information processing device, at least one portion of said third logical area functions as a substitute for said transferring logical area which stores data which is to be transferred to said first storage device, at least one portion of said second logical area functions as said data storing logical area, and said first logical area functions as said auxiliary logical volume, and wherein said storage system is changed from said first status to said second status if said first information processing device has a failure and/or if at least one of said first storage device or said second storage device receives at least one command.

65. A storage system according to claim 64, wherein:
said first controller manages a plurality of regions in said second logical area which store data, which will be transferred from said at least one portion of said second logical area to said second storage device, by using at least one pointer during said first status of said storage system.

66. A storage system according to claim 64, wherein:
said second controller manages a plurality of regions in said third logical area during said first status of said storage system.

67. A storage system according to claim 64, wherein:
said first controller manages a plurality of regions in said second logical area which store data, which will be transferred from said at least one portion of said second logical area to said second storage device, during said first status of said storage system, and said regions in said second logical area include a plurality of regions in which said data sent from said first information processing device are being stored by said first controller.

68. A storage system according to claim 64, wherein:
said second controller manages a plurality of regions in said third logical area in which said data corresponding to said at least one data of said auxiliary logical volume are stored, during said first status of said storage system.

69. A storage system according to claim 64, wherein:
said transferring logical area repeatedly stores data corresponding to each updated data stored in said primary logical volume and one or more data stored in said transferring logical area are repeatedly transferred to said second storage device during said first asynchronous remote copy process.

70. A storage system according to claim 64, wherein:
said storage system is changed from said first status to said second status if at least one of said first storage device or said second storage device receives said at least one command, said at least one command being sent from said second information processing device.

71. A storage system according to claim 70, wherein:
said second storage device, based on said at least one command, implements said fourth logical area functioning as said primary logical volume instead of said fourth logical area functioning as said auxiliary logical volume and implements said at least one portion of third logical area functioning as said transferring logical area instead of said at least one portion of third logical area functioning as said data storing logical area, and said first storage device, based on a communication with said second storage device, implements said first logical area functioning as said auxiliary logical volume instead of said first logical area functioning as said primary logical volume and implements said at least one portion of second logical area functioning as said data storing logical area instead of said at least one portion of second logical area functioning as said transferring logical area, said communication being processed based on said at least one command.

* * * * *